(12) United States Patent
Anisimovskiy

(10) Patent No.: US 10,796,145 B2
(45) Date of Patent: Oct. 6, 2020

(54) METHOD AND APPARATUS FOR SEPARATING TEXT AND FIGURES IN DOCUMENT IMAGES

(71) Applicant: Samsung Electronics Co., Ltd., Suwon-si, Gyeonggi-do (KR)

(72) Inventor: Valery Valerievich Anisimovskiy, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 16/022,016

(22) Filed: Jun. 28, 2018

(65) Prior Publication Data

US 2019/0005324 A1    Jan. 3, 2019

(30) Foreign Application Priority Data

Jun. 29, 2017   (RU) .................................. 2017123057
Jun. 22, 2018   (KR) ........................ 10-2018-0072337

(51) Int. Cl.
*G06K 9/00* (2006.01)
*G06K 9/62* (2006.01)
*G06N 3/08* (2006.01)

(52) U.S. Cl.
CPC ..... *G06K 9/00456* (2013.01); *G06K 9/00463* (2013.01); *G06K 9/6212* (2013.01);
(Continued)

(58) Field of Classification Search
CPC ........... G06K 9/00456; G06K 9/00463; G06K 9/6212; G06K 9/6218; G06K 2209/01; G06N 3/08
See application file for complete search history.

(56) References Cited

U.S. PATENT DOCUMENTS 6,937,766 B1      8/2005   Wilf et al.
6,993,185 B2 *    1/2006   Guo .................. G06K 9/00456
                                                     382/164
(Continued)

FOREIGN PATENT DOCUMENTS

CN      103839078 A      6/2014
EP      1 247 252 A1    10/2002
(Continued)

OTHER PUBLICATIONS

Chunmei Liu et al., Text Detection in Images Based on Unsupervised Classification of Edge-based Features, Institute of Automation, Chinese Academy of Sciences, China, Proceedings of the 2005 Eight International Conference on Document Analysis and Recognition.

(Continued)

*Primary Examiner* — Syed Haider
(74) *Attorney, Agent, or Firm* — Jefferson IP Law, LLP

(57) ABSTRACT

A method and apparatus for separating a text and figure of a document image are provided. The method of separating the text and the figure of the document image includes acquiring a document image, dividing the document image into a plurality of regions of interest, acquiring a feature vector by using a two-dimensional (2D) histogram by resizing the regions of interest and extracting a connection component of the regions of interest, acquiring a transformation vector of the feature vector by using a kernel, obtaining a cluster center of the transformation vector, and performing clustering on the cluster center to acquire a supercluster, and classifying the supercluster into one of a text class and a figure class, based on the number of superclusters.

15 Claims, 21 Drawing Sheets

(52) U.S. Cl.
CPC ............. *G06K 9/6218* (2013.01); *G06N 3/08* (2013.01); *G06K 2209/01* (2013.01)

(56) References Cited

U.S. PATENT DOCUMENTS

| | | | |
|---|---|---|---|
| 6,996,549 | B2 | 2/2006 | Zhang et al. |
| 7,099,510 | B2 | 8/2006 | Jones et al. |
| 7,412,425 | B2 | 8/2008 | Rifkin et al. |
| 7,480,640 | B1 | 1/2009 | Elad et al. |
| 7,570,816 | B2 | 8/2009 | Bargeron et al. |
| 8,243,991 | B2 | 8/2012 | Das et al. |
| 8,509,534 | B2 | 8/2013 | Galic et al. |
| 9,147,132 | B2 | 9/2015 | Marchisio et al. |
| 9,152,888 | B2 | 10/2015 | Kenyon et al. |
| 2010/0092095 | A1* | 4/2010 | King .................. G06Q 30/02 382/229 |
| 2015/0199821 | A1 | 7/2015 | Lyubarskiy |
| 2016/0148074 | A1* | 5/2016 | Jean .................. G06K 9/4671 382/190 |
| 2017/0371856 | A1* | 12/2017 | Can .................. G06F 17/2211 |

FOREIGN PATENT DOCUMENTS

| | | |
|---|---|---|
| EP | 1 775 683 A1 | 4/2007 |
| EP | 2 315 159 A2 | 4/2011 |
| RU | 2 533 441 C2 | 11/2014 |
| RU | 2 595 559 C2 | 8/2016 |

OTHER PUBLICATIONS

Julinda Gllavata, et al., Text Detection in Images Based on Unsupervised Classification of High-Frequency Wavelet Coefficients, Dept. of Mathematics and Computer Science, University of Marburg, D-35032, Marburg, Germany, Proceedings of the 17th International Conference on Pattern Recognition, 2004.

O'Gorman; "The Document Spectrum for Page Layout Analysis"; IEEE Transactions on Pattern Analysis and Machine Intelligence; XP000413107; Nov. 15, 1993.

Anisimovskiy et al.; "Text/Figure Separation in Document Images Using Docstrum Descriptor and Two-Level Clustering"; Samsung R&D Institute Russia, Moscow, Russia; 20 I 8, Society for Imaging Science and Technology; XP55522037.

Ferilli et al.; "A histogram-based Technique for Automatic Threshold Assessment in a Run Length Smoothing-based Algorithm"; Jun. 9-11, 2010; Boston MA.; XP58149797.

* cited by examiner

FIG. 7

US 2009/0108737 A1 carbonate (87.4 g, 632.5 mmol) in of 300 mL dimethoxyethane, and 200 mL of water. Nitrogen was bubbled directly into the mixture for 20 minutes, then palladium acetate was added (2.84 g, 12.65 mmol). The reaction mixture was heated to reflux under nitrogen. At the end of the day, a trace of 2-bromopyridine was detected by TLC. Thus an additional 10 grams of 2-bromophenylboronic acid was added and reaction continued to reflux overnight. The reaction mixture was cooled and water was added along with ethyl acetate. The layers were separated and the aqueous layer was extracted with ethyl acetate. The organic layers were dried over magnesium sulfate, filtered, and evaporated to a brown oil. The oil was purified by column chromatography eluting with 0 to 40% ethyl acetate/hexanes followed by distillation under vacuum. Obtained 45.1 g of desired product (52% yield), as confirmed by GC-MS.

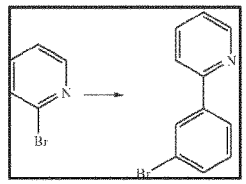

[0254] A mixture was prepared of 2-(3-bromophenyl)pyridine (12.2 g, 52.10 mmol), 3-(4,4,5,5-tetramethyl-1,3,2-dioxaborolan-2-yl)phenol (13.76 g, 62.53 mmol), 2-dicyclohexylphosphino-2',6'-dimethoxybiphenyl (856 mg, 2.08 mmol), potassium phosphate tribasic monohydrate (36 g, 156.3 mmol) in 180 mL of dioxane, and 18 mL of water. Nitrogen was bubbled directly into the mixture for 20 minutes, then tris(dibenzylideneacetone)dipalladium(0) was added (477 mg, 0.52 mmol). The reaction mixture was heated at 100° C. for 3 hours under nitrogen, then allowed to cool to room temperature overnight. Water was added to the reaction mixture and the mixture was extracted three times with ethyl acetate. The organic extracts were dried over magnesium sulfate, filtered and evaporated to a residue. The residue was purified by column chromatography eluting with 20 and 40% ethyl acetate/hexanes. Obtained 12.5 g of a yellow oil (97% yield), as confirmed by GC-MS.

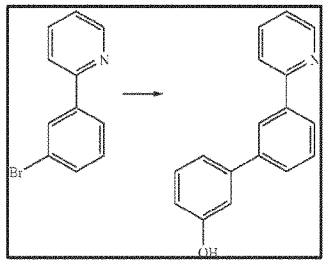

[0255] 12.5 gram (50.6 mmol) 3'-(pyridin-2-yl)biphenyl-3-ol, 12 ml pyridine, and 200 ml methylene chloride were mixed in a 500 ml round bottle flask at 0° C. To the mixture, 14.3 gram (101.2 mmol) trifluoroacetic anhydride was added and stirred for 30 min at 0° C., then stirred at room temperature for 1 hour. The reaction mixture was washed with water several times. 19 gram (100% yield) triflate was obtained after evaporation of solvent, as confirmed by GC-MS.

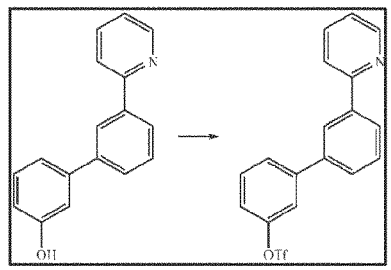

[0256] 8.8 g (23.2 mmol) 3'-(pyridin-2-yl)biphenyl-3-yl trifluoromethanesulfonate, 4.7 g (46 mmol) isobutaneboronic acid, 211 mg Pd$_2$(dba)$_3$ (0.23 mmol), 396 mg (0.965 mmol) S-Phos, 16.7 gram (72.6 mmol) K$_3$PO$_4$H$_2$O, and 300 ml toluene were charged in a 500 ml round bottle flask. The reaction mixture was heated up to reflux under nitrogen overnight with stirring. The reaction mixture was purified by silica gel chromatography with 10% (v/v) ethyl acetate in hexane as elute. ~5.8 gram solid (yield 87%) product was obtained, as confirmed by GC-MS.

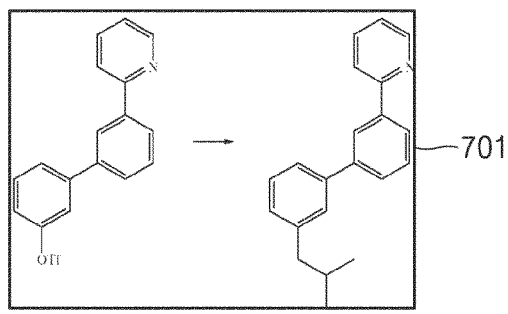

701

[0257] 3.4 gram (11.8 mmol) 2-(3'-isobutylbiphenyl-3-yl)pyridine, 2.0 gram (5.3 mmol) IrCl$_3$.3H$_2$O, and 150 ml solvent mixture (2 ethoxyethanol/water: 3:1) were charged in a 250 ml round bottle flask. The reaction mixture was heated up to reflux under nitrogen overnight. The reaction mixture was cooled down and added 100 ml methanol, then filtered. The solid was washed with methanol and dried. About 3.85 gram of chloro-bridged iridium dimer was obtained and used for next step without further purification.

FIG. 9

METHOD AND APPARATUS FOR SEPARATING TEXT AND FIGURES IN DOCUMENT IMAGES

CROSS-REFERENCE TO RELATED APPLICATION(S)

This application is based on and claims priority under 35 U.S.C. § 119 of a Russian patent application number 2017123057, filed on Jun. 29, 2017, in the Federal Service for Intellectual Property, Patents and Trademarks of the Russian Federation, and of a Korean patent application number 10-2018-0072337, filed on Jun. 22, 2018, in the Korean Intellectual Property Office, the disclosure of each of which is incorporated by reference herein in its entirety.

BACKGROUND

1. Field

The disclosure relates to analysis and processing of a document image. More particularly, the disclosure relates to a method and apparatus for separating text and a figure of a document image.

2. Description of Related Art

Separation of text and a figure included in a document image is used in various image analysis and processing tasks such as document indexing and retrieval, document object detection and recognition, optical character recognition (OCR), and document compression.

For example, when classifying a region of interest (ROI) included in a document image into one of two classes, such as text and a figure, a non-text area may be removed in an OCR process or a text area may be removed during indexing or retrieval of an image, thus significantly reducing a data amount needed for document processing.

In methods of separating text and figures of document images according to the related art, a descriptor of an ROI is designed to generate and allocate a feature vector that is easily distinguishable with respect to text and non-text areas, or a machine learning algorithm with respect to a manually labeled data set is used to separate text and figures of a document.

One of the widely used methods for separating text and figures of a document image is to extract simple features from a region of interest and then use heuristics so as to separate a text from a non-text area and thereby separate the two features.

According to this method, a text and figures are separated in a document image by using functions such as connected components, run-length statistics, cross-correlation between scan lines, projection profiles, and black pixel distributions or the like.

When a classification method based on heuristics is used, and when a figure has a significantly different structure from a text structure, such as a photograph, a painting, or a video image frame, it is possible to quickly and efficiently classify text and a figure. However, the classification method based on heuristics often exhibits significantly low separation precision with respect to documents that include line drawings or block diagrams with a lot of texts or documents including similar types of figures.

In particular, one of the major drawbacks of the above classification method is that heuristics used therein is typically inferred from observations of figures that generally belong to a particular class or a plurality of classes, and may not be generalized with respect to other classes.

This drawback may be particularly problematic for documents that include various figure class sets, some of which do not completely comply with corresponding heuristics.

For example, a classification method that relies on run-length histograms is likely to incorrectly classify a block diagram that contains many texts, as a text region.

This problem may be solved by another approach that uses a supervised learning-based machine learning algorithm in documents of this kind, that is, line drawings, block diagrams with a lot of text, or figures of similar types to these.

More specifically, as separation of text and figures may be formulated as a binary classification issue, a classification method that uses a supervised machine learning algorithm may utilize manually labeled data sets to learn to distinguish between a text region and a non-text region.

When a supervised learning-based algorithm as described above uses a large-scale data set, every relevant figure class having a sufficiently expressed training data set is required. Thus, in order to eliminate the need for manually classified training data sets, an unsupervised learning-based machine learning algorithm has been developed.

For example, a K-means algorithm, one of unsupervised learning-based machine learning algorithms, may be used to cluster statistical features computed using frequency waves or edge maps.

However, the K-means algorithm may not deal with non-convex, nested, or elongated clusters, and shows low separation performance regarding text and figures especially when a Euclidean distance is used, and is thus not suitable for separating text and circuit diagrams, particularly, text block diagrams, electrical circuits or other similar business graphics.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for separating text and figures of a document image by extracting a feature vector from a plurality of regions of interest included in an image and performing clustering on the extracted feature vector.

Additional aspects will be set forth in part in the description which follows and, in part, will be apparent from the description, or may be learned by practice of the presented embodiments.

In accordance with an aspect of the disclosure, a method of separating text and a figure of a document image are provided. The method includes acquiring the document image, dividing the document image into a plurality of regions of interest, acquiring a feature vector by using a two-dimensional (2D) histogram obtained through resizing of one of the regions of interest among the plurality of the regions of interest, and extracting a connection component of the resized region of interest, acquiring a transformation vector of the feature vector by using a kernel, acquiring a cluster center of the transformation vector, acquiring a supercluster by performing clustering on the cluster center, and classifying the supercluster into one of a text class and a figure class, based on the number of superclusters.

The dividing of the document image into a plurality of regions of interest may include filling horizontal background pixels having a length equal to or less than a preset first threshold value, with a foreground color, filling vertical background pixels having a length equal to or less than a preset second threshold value, with the foreground color, performing a logical OR operation on a plurality of images including the horizontal background pixels filled with the foreground color and the vertical background pixels filled with the foreground color, acquiring a first connection component from an image of a result of the logical OR operation by performing extraction of a connection component, and selecting a boundary box including the first connection component as the regions of interest.

The acquiring of the feature vector by using a 2D histogram obtained through resizing one of the regions of interest among the plurality of the regions of interest, and the extracting of the connected component of the resized region of interest may include resizing the regions of interest to a preset size while maintaining an aspect ratio of the regions of interest, acquiring a second connection component by performing extraction of a connection component on the resized regions of interest and acquiring a center point of the second connection component, determining a nearest neighbor of the center point of the second connection component, generating a 2D histogram with respect to a pair including the center point and the nearest neighbor, performing normalization on the 2D histogram, and reconstructing the 2D histogram on which the normalization is performed, as a feature vector.

The resizing of the regions of interest to a preset size while maintaining an aspect ratio of the regions of interest may include while maintaining the aspect ratio of the regions of interest, adjusting whichever one of a height and a width of the regions of interest that is longer than the other to have a length corresponding to 300 pixels or 500 pixels, and performing padding such that whichever one of the height and the width of the regions of interest that is shorter than the other has a length corresponding to 300 pixels or 500 pixels.

The acquiring of the second connection component by performing extraction of the connection component on the resized regions of interest and the acquiring of the center point of the second connection component may include filtering a connection component having a boundary box whose width or height is less than a preset threshold value.

The performing of the normalization on the 2D histogram may further include dividing each of distances between the center point and the nearest neighbor by an average distance between the center point and the nearest neighbor.

The reconstructing of the 2D histogram on which the normalization is performed, as a feature vector, may include performing normalization such that the 2D histogram has a unified L1-norm.

The acquiring of the supercluster may include transforming the feature mapping into a first transformation vector by using kernel-approximating feature mapping, acquiring a cluster center by performing first level clustering on the first transformation vector, and acquiring a supercluster by performing second level clustering on the cluster center.

The transforming of the feature vector into a first transformation vector by using the kernel-approximating feature mapping may include performing kernel-approximating feature mapping based on at least one of a Hellinger's kernel, an $\chi^2$ kernel, an intersection kernel, a Jensen-Shannon kernel, and the Jaccard kernel.

The acquiring of the supercluster by performing second level clustering on the cluster center may include performing second level clustering based on at least one clustering algorithm from among an affinity propagation clustering algorithm, an agglomerative clustering algorithm, a mean shift clustering algorithm, a balanced iteration reduction and hierarchical clustering (BIRCH) algorithm, a density-based space clustering of noisy applications (DBSCAN) algorithm, a hierarchical DBSCAN (HDBSCAN) algorithm, a single-class support vector machine (SVM) algorithm, and a spectral clustering algorithm.

The classifying of the supercluster into one of classes of text and a figure, based on the number of superclusters may include, when the number of acquired superclusters is two, using a zero-shot label inference operation to classify each supercluster into one of a text class and a figure class, and when the number of acquired superclusters is more than two, using a semi-supervised label propagation operation to classify each supercluster into one of classes, a text class and a figure class.

The using of a zero-shot label inference operation to classify each supercluster into one of a text class and a figure class may include labeling each of the superclusters into one of a text class and a figure class based on a ratio between a text region of interest and a figure region of interest.

The using of a semi-supervised label propagation operation to classify each supercluster into one of classes, a text class and a figure class may include calculating a degree of text contamination which is a ratio of a region of interest belonging to a subset assigned with a text label with respect to each of the superclusters, and labeling a supercluster with respect to which a degree of the text contamination exceeds a preset threshold, as a text class, and labeling other superclusters with respect to which a degree of the text contamination does not exceed the preset threshold as a figure class.

The subset assigned with the text label may be obtained, after determining that none of texts of the document image contains a particular word, by labeling the entire regions of interest as a text region of interest.

In accordance with another aspect of the disclosure, an apparatus for separating a text and a figure of a document is provided. The apparatus includes at least one processor configured to acquire a document image, divide the document image into a plurality of regions of interest, acquire a feature vector by using a 2D histogram by resizing one of the regions of interest among the plurality of the regions of interest, and extract a connection component of the resized region of interest, acquire a transformation vector of the feature vector by using a kernel, acquire a cluster center of the transformation vector, perform clustering on the cluster center to acquire a supercluster, and classify the supercluster into one of a text class and a figure class based on the number of superclusters, and a memory for storing the document image and the supercluster classified into one of the text class and the figure class by the at least one processor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates an example of a region of interest extracted from a document image including both text and figures, according to an embodiment of the disclosure;

FIG. 9 is a diagram illustrating an example of each pair including a nearest neighbor and a center point of a connected component for a text region of interest, according to an embodiment of the disclosure;

Throughout the drawings, it should be noted that like reference numbers are used to depict the same or similar elements, features, and structures.

DETAILED DESCRIPTION

Figure 1:
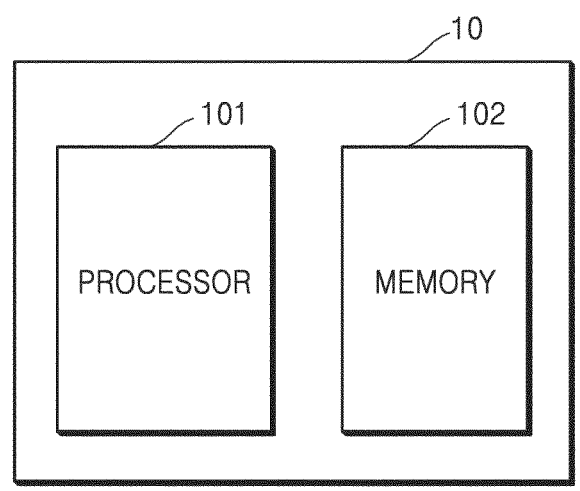
FIG. 1 is a block diagram of an apparatus for separating text and figures of a document image according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In regard to a method of analyzing an image included in a document, separation of text and figure areas of a document image may be used as pre-processing to prepare data to be used in subsequent operations which are typically remarkably more complicated, and thus, an algorithm used in a separation process needs to be relatively lightweight and fast to process data.

These requirements imply that a lightweight global descriptor extraction algorithm that generates a low-dimensional feature vector has to be used, and particularly for binary document images such as a monochrome image (for example, a text), a specific descriptor extraction algorithm designated to correspond to a document image including a text area and a figure area that is partially filled with text has to be used.

Another requirement for algorithms used in separation of text and figure areas is that classification algorithms should be suitable for processing large data sets.

As there are no classified representative data sets, a classification algorithm may label only a small portion of a feature vector, and may use a semi-supervised label propagation operation which is used to propagate a label to unlabeled data or a zero-shot label inference operation which is used when data set labeling is not needed at all.

Finally, another requirement for algorithms used in separation of text and figure regions is that they are able to completely and efficiently separate text or figure regions, and such separation algorithms may provide a high degree of recall and precision in a process of separating text and figure regions.

For reference, one of the main objectives of the disclosure is separation of figures for subsequent indexing and retrieval, and thus, in the method of separating according to the disclosure, a recall of a figure region of interest is set to about 90% and a precision of the figure region of interest to about 75%. Also, numerical values included in all document figures processed according to the separation method as described above are omitted, and text contamination of up to 25% is allowed in a selected set of regions of interest.

Low recall prevents indexing with respect to too many figures, and low precision excessively increases computation over a text region of interest, and thus, it is very important to keep a high degree of both recall and precision in separation of text and figures.

FIG. 1 is a block diagram of an apparatus 10 for separating text and figures of a document image according to an embodiment of the disclosure.

Referring to FIG. 1, the apparatus 10 for separating text and figures of a document image according to some embodiments may include a processor 101 (e.g., at least one processor) and memory 102 (e.g., a storage).

The processor 101 acquires a document image and divides the acquired document image into a plurality of regions of interest.

A document image may include a monochrome (binary) image that uses a Manhattan layout to represent text and a figure, and the document image may be divided through a run-length smoothing with OR (RLSO) algorithm.

The processor 101 acquires a feature vector by using a two-dimensional (2D) histogram obtained by resizing a region of interest and extracting a connected component of the resized region of interest. The processor 101 may extract a feature vector from a region of interest based on a global descriptor.

The processor 101 acquires a transformation vector with respect to a feature vector by using a kernel, acquires a cluster center of the transformation vector, and performs clustering on the cluster center to acquire a supercluster.

The processor 101 classifies the supercluster into one of classes, text or a figure, based on the number of superclusters.

That is, the processor 101 may separate text and a figure of a document image by dividing the document image into a plurality of regions of interest and extracting a supercluster through two-level clustering on feature vectors for each region of interest.

The memory 102 may store a document image and a supercluster classified by the processor 101 into one of classes, either text or a figure.

In an embodiment, at least one of the processor 101 and the memory 102 may be manufactured in the form of at least one hardware chip and mounted on an electronic device.

For example, at least one of the processor 101 and the memory 102 may be fabricated in the form of a dedicated hardware chip for artificial intelligence (AI) or may be a portion of a general-purpose processor (e.g., a central processing unit (CPU) or an application processor) or a graphics-only processor (e.g., a graphical processing unit (GPU)) and mounted on various electronic devices described above.

Figure 2:
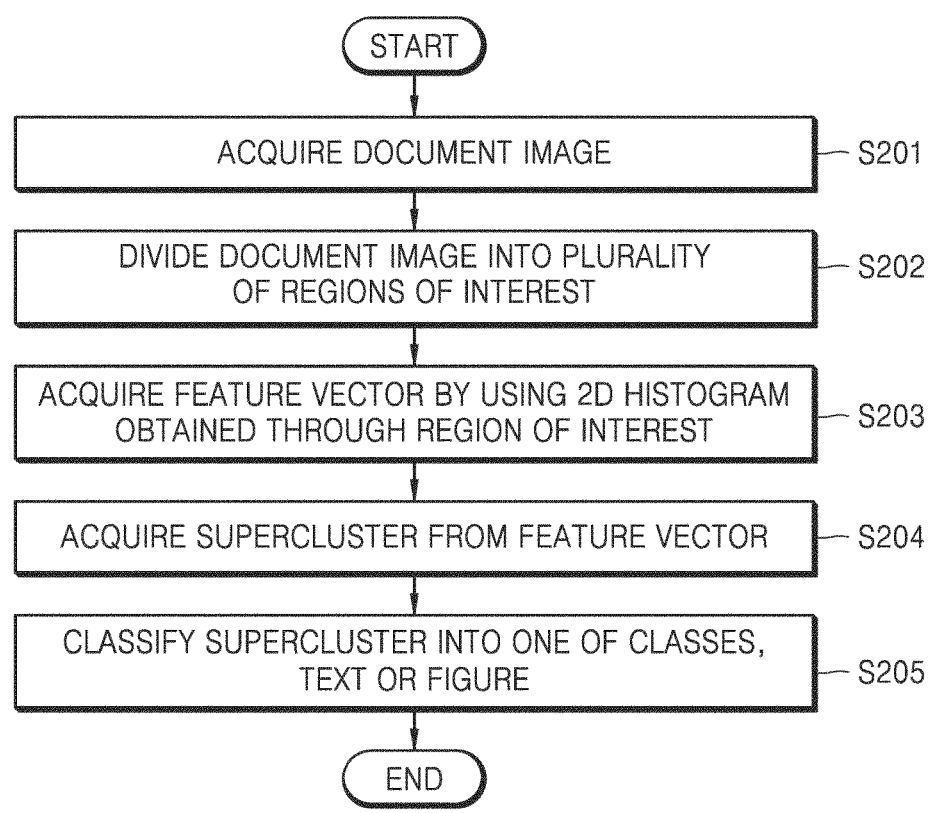
FIG. 2 is a flowchart sequentially showing a method of distinguishing text and a figure of a document image according to an embodiment of the disclosure.

FIG. 2 is a flowchart sequentially showing a method of distinguishing text and a figure of a document image according to an embodiment of the disclosure.

Referring to FIG. 2, a processor first acquires a document image at operation S201.

Once the document image is acquired, the processor divides the document image into a plurality of regions of interest at operation S202.

A document image may include a monochrome (binary) image that uses a Manhattan layout to represent text and a figure, and the document image may be divided through a RLSO algorithm.

The RLSO algorithm is a modified version of a run-length smoothing algorithm (RLSA), and a detailed process of dividing an image into regions of interest by using the RLSO algorithm will be described in detail later with reference to FIG. 7.

The processor acquires a feature vector by using a 2D histogram obtained by resizing of a region of interest and extracting a connected component of the resized region of interest at operation S203.

Once the document image is divided into regions of interest, the processor extracts a feature vector from the regions of interest based on a global descriptor. The global descriptor may include Hu-moment, Haralick feature, shape context descriptor (SCD), run-length histogram (RLH), local binary patterns (LBP), adaptive hierarchical density histogram (AHDH), and document spectrum descriptor (hereinafter referred to as a Docstrum descriptor), which are suitable for binary document images.

In an embodiment, a feature vector for each of the regions of interest may be extracted by a Docstrum descriptor from among global descriptors.

As the Docstrum descriptor is designed to analyze a page layout of a text-only document, a relatively chaotic feature vector may be extracted with respect to other regions than text regions, and such a chaotic feature vector may be easily distinguished from a regular feature vector extracted with respect to a text region.

A detailed process of extracting a feature vector for each region of interest through a Docstrum descriptor will be described in detail later with reference to FIG. 4.

When a feature vector is acquired, the processor acquires a transformation vector with respect to a feature vector by using a kernel, acquires a cluster center of the transformation vector, and performs clustering on the cluster center to acquire a supercluster at operation S204.

The processor classifies the supercluster into one of classes, text or a figure, based on the number of superclusters at operation S205.

A detailed process performed by the processor to acquire a supercluster from a feature vector and classifying the supercluster into one of classes, text or a figure, will be described later with reference to FIG. 5.

Figure 3:
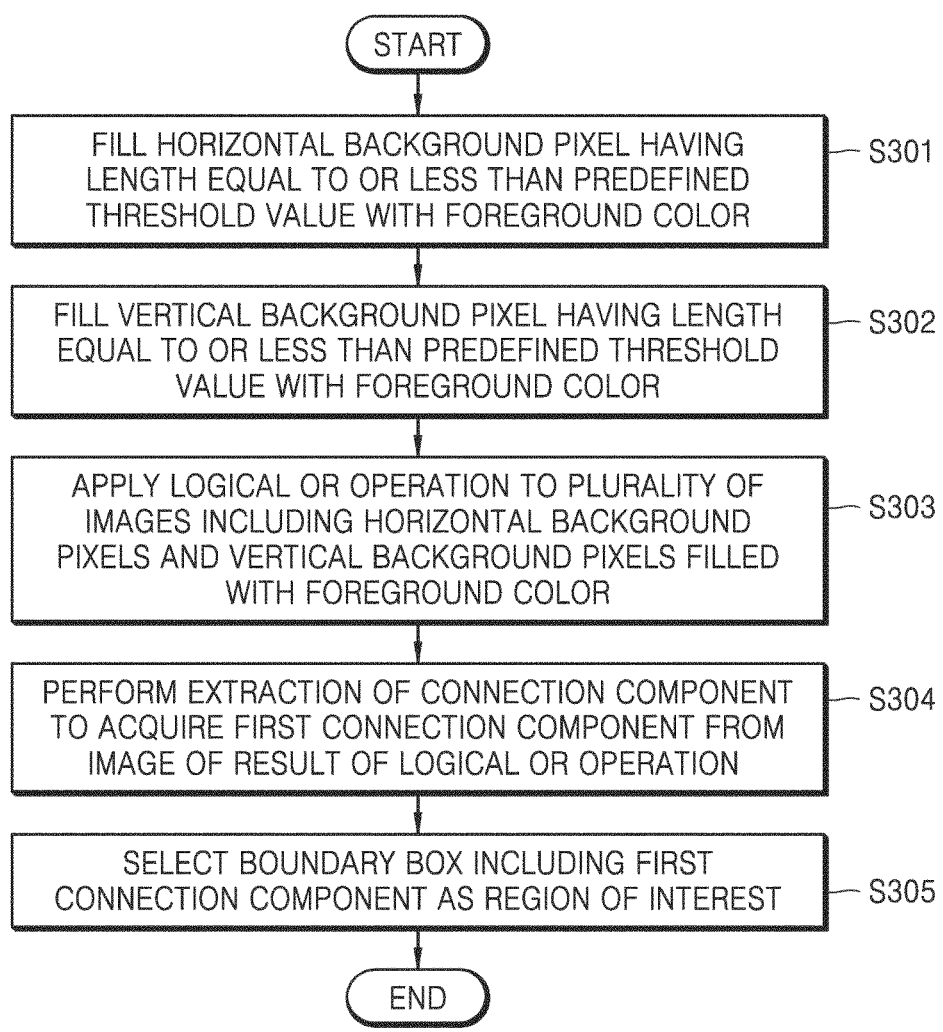
FIG. 3 is a flowchart sequentially illustrating each operation of a method of dividing a document image into regions of interest according to an embodiment of the disclosure.

FIG. 3 is a flowchart sequentially illustrating each operation of a method of dividing a document image into regions of interest according to an embodiment of the disclosure.

Referring to FIG. 3, a processor fills a horizontal background pixel having a length equal to or less than a predefined threshold value, with a foreground color at operation S301, and fills a vertical background pixel having a length equal to or less than a predefined threshold value, with a foreground color at operation S302.

The processor applies a logical OR operation to a plurality of images including the horizontal background pixel and the vertical background pixel filled with the foreground color at operation S303.

The RLSO algorithm used to divide a document image into regions of interest uses a logical OR operation between horizontally and vertically smoothed images, unlike the RLSA algorithm of the related art that uses a logical AND operation.

In an embodiment, the RLSO algorithm may further simplify each operation of dividing a document image into regions of interest by replacing pre-smoothing estimation values by computing background pixel run lengths at a percentage of 90% and 80%, respectively, for horizontal and vertical smoothing. The percentages are not limited to any particular values, and in other embodiments, other percentages of background pixel run lengths may be used for each of horizontal and vertical smoothing without departing from the scope of the disclosure.

The processor performs extraction of a connection component to acquire a first connection component from an image corresponding to a result of a logical OR operation at operation S304.

When the first connection component is acquired, the processor selects a boundary box including the first connection component as a region of interest at operation S305.

Figure 6A:
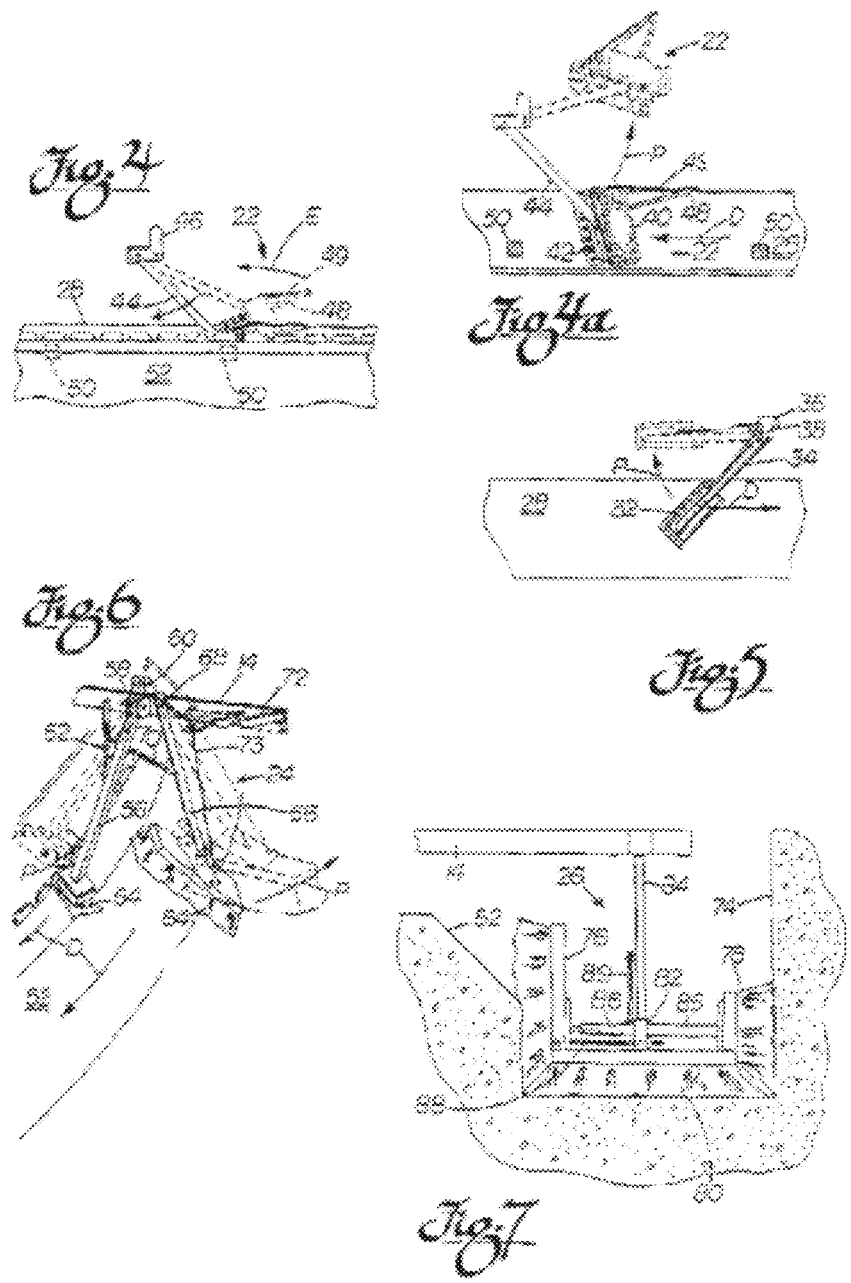
FIG. 6A is a diagram illustrating an example of a document image to which a run-length smoothing with OR (RLSO) algorithm according to an embodiment of the disclosure.
Figure 6B:
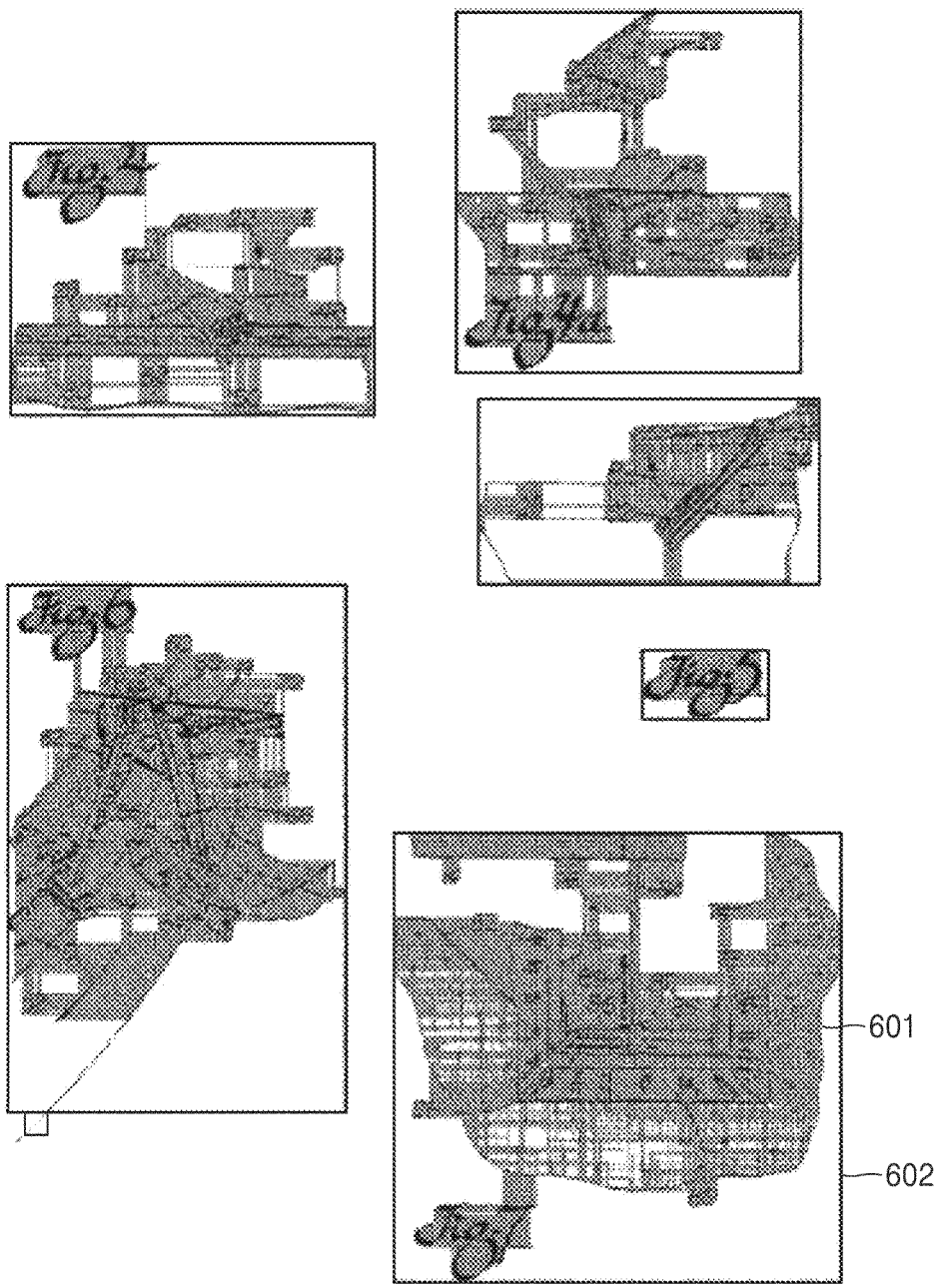
FIG. 6B is a diagram illustrating an example of a document image to which an RLSO algorithm according to an embodiment of the disclosure.

An example of application of the RLSO algorithm according to an embodiment is illustrated in FIGS. 6A and 6B, and an example of a region of interest extracted from a document image that includes both a text and a figure is illustrated in FIG. 7.

FIG. 6A is a diagram illustrating an example of a document image to which a run-length smoothing with OR (RLSO) algorithm according to an embodiment of the disclosure.

FIG. 6B is a diagram illustrating an example of a document image to which an RLSO algorithm according to an embodiment of the disclosure.

Referring to FIG. 6B, reference numeral 601 denotes a first connection component, and reference numeral 602 denotes a boundary box.

FIG. 7 illustrates an example of a region of interest extracted from a document image including both text and figures, according to an embodiment of the disclosure. Referring to FIG. 7, reference numeral 701 denotes a region of interest.

Meanwhile, according to an embodiment, a region of interest corresponding to a size less than 0.1% of the entire image area may be filtered regardless of the ratio of the size.

Figure 4:
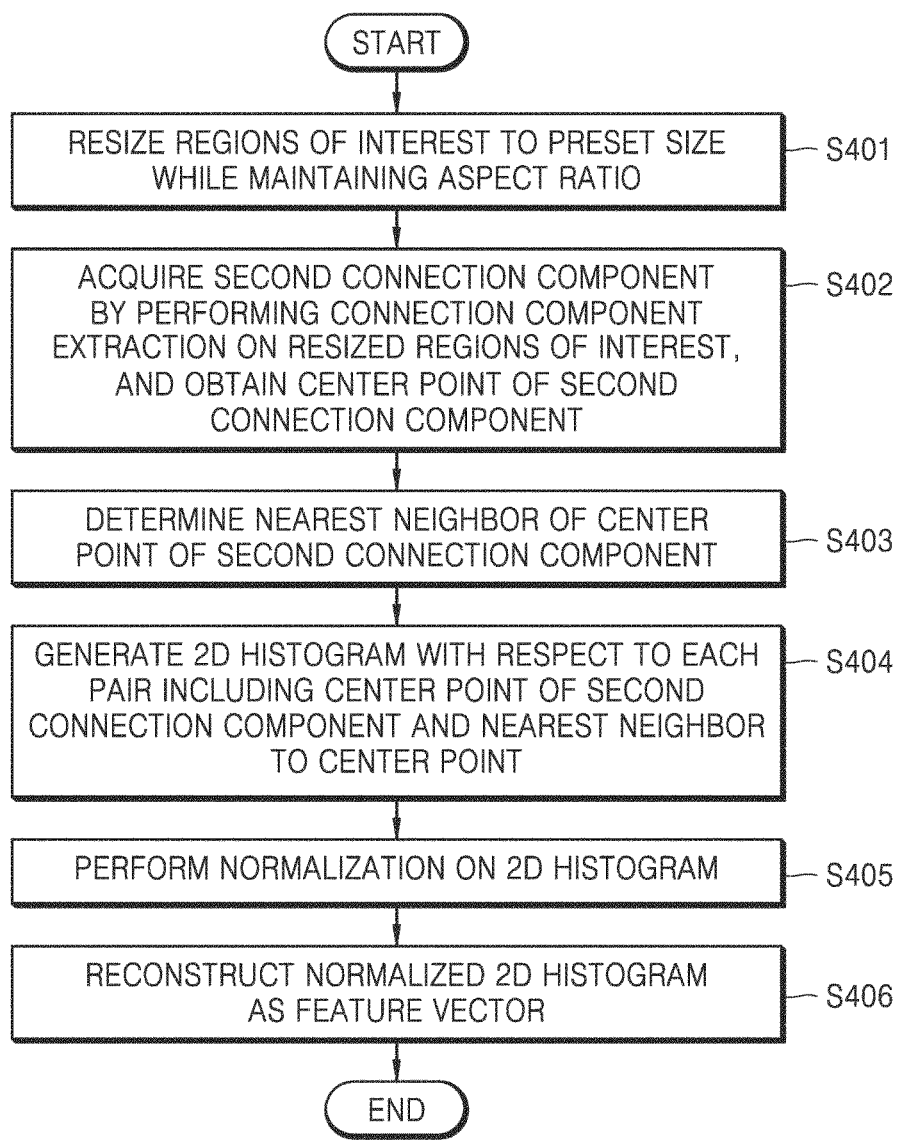
FIG. 4 is a flowchart sequentially illustrating a method of extracting a feature vector of each region of interest according to an embodiment of the disclosure.

FIG. 4 is a flowchart sequentially illustrating a method of extracting a feature vector of each region of interest according to an embodiment of the disclosure.

Referring to FIG. 4, a processor resizes a region of interest to a preset size while maintaining an aspect ratio at operation S401.

In an embodiment, the processor may resize the region of interest to a preset size by adjusting whichever one of a height and a width of the region of interest is longer than the other to have a length corresponding to 300×500 pixels while maintaining the aspect ratio of the region of interest, and then by performing padding such that whichever one of the height and the width of the region of interest is not adjusted has a length corresponding to 300×500 pixels.

For example, in order to adjust a size of the region of interest to a size of 500×500 pixels, the processor may adjust a height of the region of interest which is longer than a width of the region of interest, to a length corresponding to 500 pixels, and then may perform padding such that the width of the adjusted region of interest to have a length corresponding to 500 pixels according to the height thereof while maintaining a preset aspect ratio.

A typical region of interest has a far larger size than 500×500 pixels, and thus, in order to reduce computational complexity, resizing of the region of interest is performed, and the aspect ratio of the region of interest is maintained uniform to prevent distortion of a distribution of a distance or angle due to isotropic resizing.

A resizing size of a region of interest may also be selected through compromise between computational complexity of a descriptor and detailed preservation of a figure. A resizing size of a region of interest may be set to a size of N×N pixels selected in a range from about 300×300 pixels to about 500×500 pixels.

When a region of interest is resized to a preset size, the processor acquires a second connection component by performing connection component extraction with respect to the resized region of interest, and acquires a center point of the second connection component at operation S402.

In an embodiment, the processor may filter a second connection component including a boundary box having a height or width that is less than a preset threshold value.

For example, the processor may filter a second connection component including a boundary box having a width or height that is less than 1% with respect to the resized region of interest.

The processor determines a nearest neighbor of the center point of the second connection component at operation S403.

When the nearest neighbor of the center point of the second connection component is determined, the processor generates a Docstrum Descriptor of a pair including a center point of the second connection component and the nearest neighbor of the center point, that is, a 2D histogram with respect to a pair including the center point of the second connection component and the nearest neighbor of the center point at operation S404.

In an embodiment, the processor may determine K neighbor center points located closest to the center point of each second connection component, from among neighbor points close the center point of the second connection component, as a nearest neighbor of the second connection component.

Here, the closest K neighbor center points include from a neighbor center point that is closest to the second connection component to a Kth neighbor center point that is closest to the second connection component with respect to a distance from the second connection component, and a distance between two center points is a Euclidean distance between center points on a two-dimensional plane.

Meanwhile, an angle with respect to a pair of center points is calculated based on an angle between a line connecting the center points and a horizontal line.

When a 2D histogram is generated, the processor performs normalization on the 2D histogram at operation S405.

The number K of the center points constituting nearest neighbors is variable, but when the number of center points is relatively small (for example, four or less), a 2D histogram with respect to a pair including a center point of a second connection component and a nearest neighbor may be formed uniformly.

Accordingly, the processor may perform normalization on the 2D histogram by dividing each distance between each center point and each nearest neighbor by an average distance of each distance between each center point and each nearest neighbor of each pair.

When normalization on the 2D histogram is performed, the processor reconstructs the normalized 2D histogram as a feature vector at operation S406.

According to an embodiment, the processor may perform normalization on a distance between a center point and a nearest neighbor such that a Docstrum Descriptor is not affected by scaling. The 2D histogram may be additionally normalized such that a sum of absolute values of a vector element, that is, $L_i$ norm, is 1.

Meanwhile, it should be noted that the normalization in the above-described operation of resizing of a region of interest and constructing of a 2D histogram is different from a previous Docstrum Descriptor version.

Meanwhile, according to an embodiment, the processor may use 64 angle bins (a 'bin' refers to an interval between histograms) to generate a 2D histogram and twenty distance bins, and may reconstruct a feature vector of 1280 dimensions based on the above 2D histogram.

The above-described setting may be selected through compromise between a descriptor dimension and its discriminative capability of separating a text and a figure in a document image.

Figure 8:
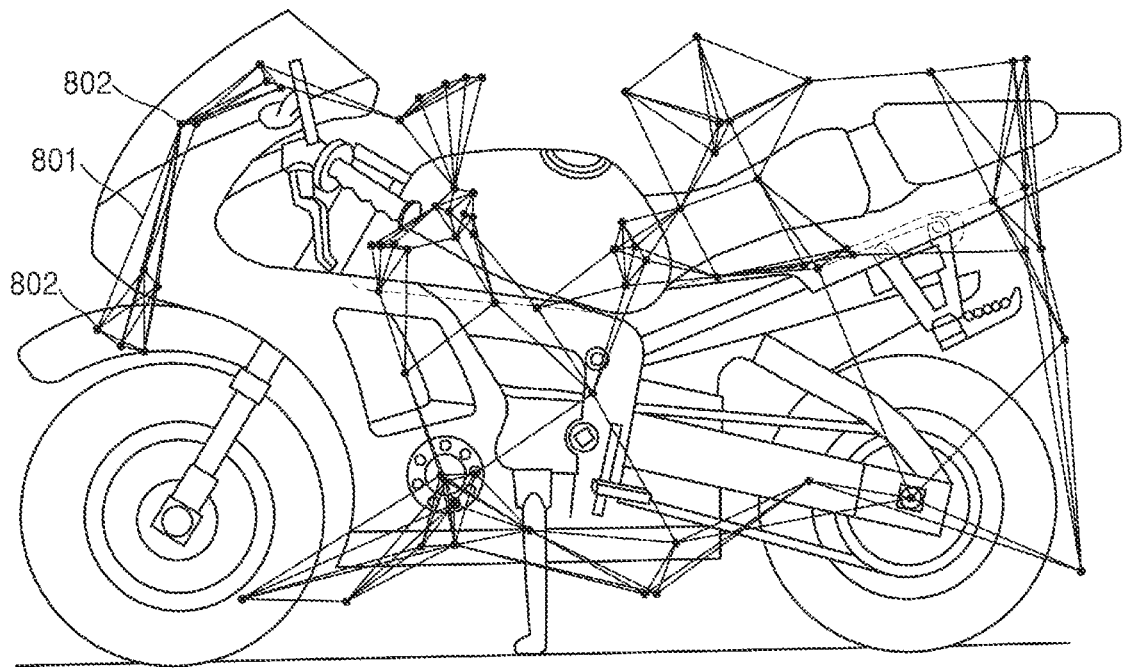
FIG. 8 is a diagram illustrating an example of each pair including a nearest neighbor and a center point of a connected component with respect to a figure region of interest, according to an embodiment of the disclosure.
Figure 9:
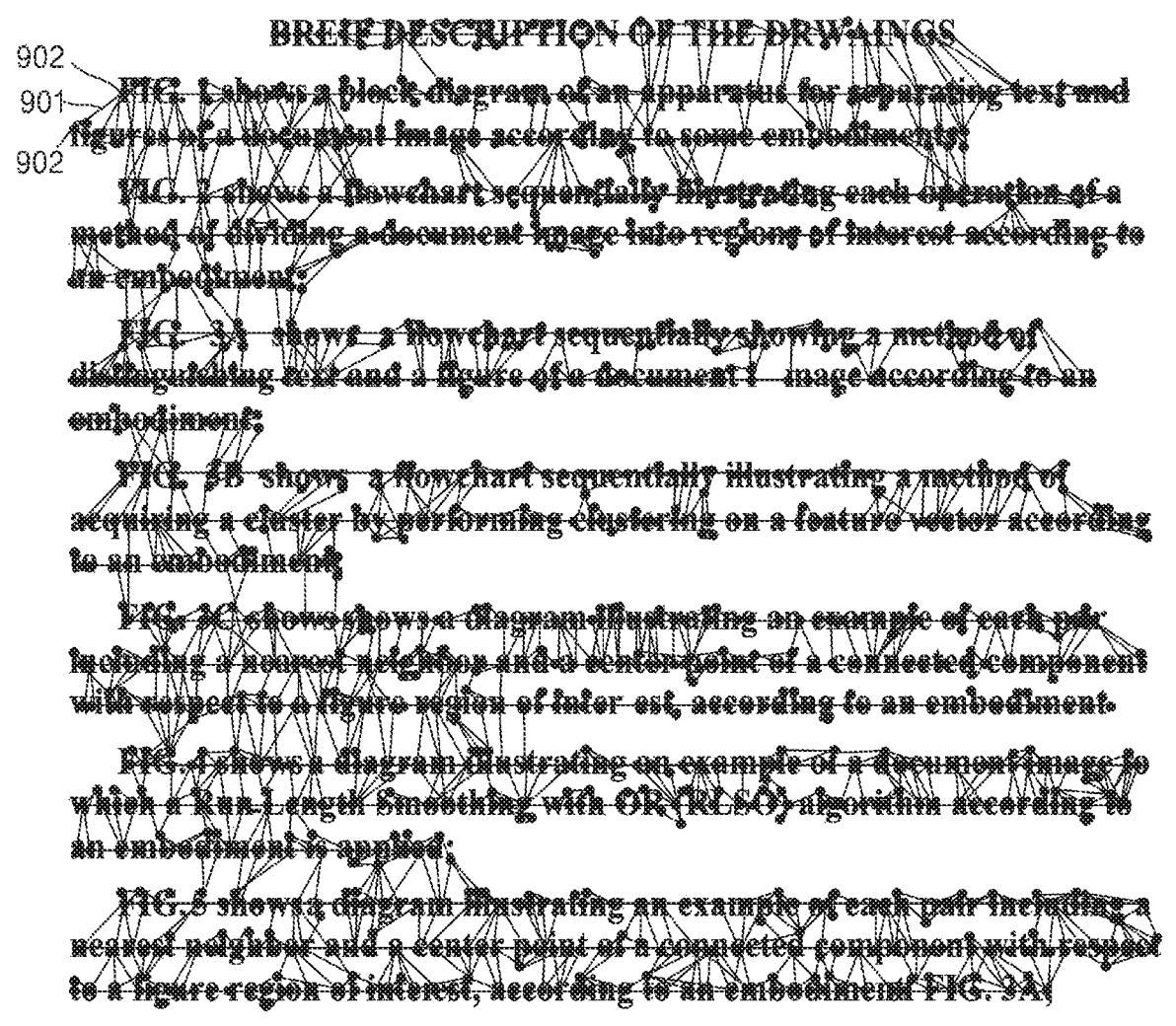

FIGS. 8 and 9 illustrate examples of a pair including a center point and a nearest neighbor of each of a figure region of interest and a text region of interest and a connection component according to various embodiments of the disclosure.

Referring to FIG. 8, a pair 802 including a center point and a nearest neighbor of a figure region of interest and a connection component 801 corresponding to the pair 802 are illustrated.

Referring to FIG. 9, a pair 902 including a center point and a nearest neighbor of a text region of interest and a connection component 901 corresponding to the pair 902 are illustrated.

Figure 10A:
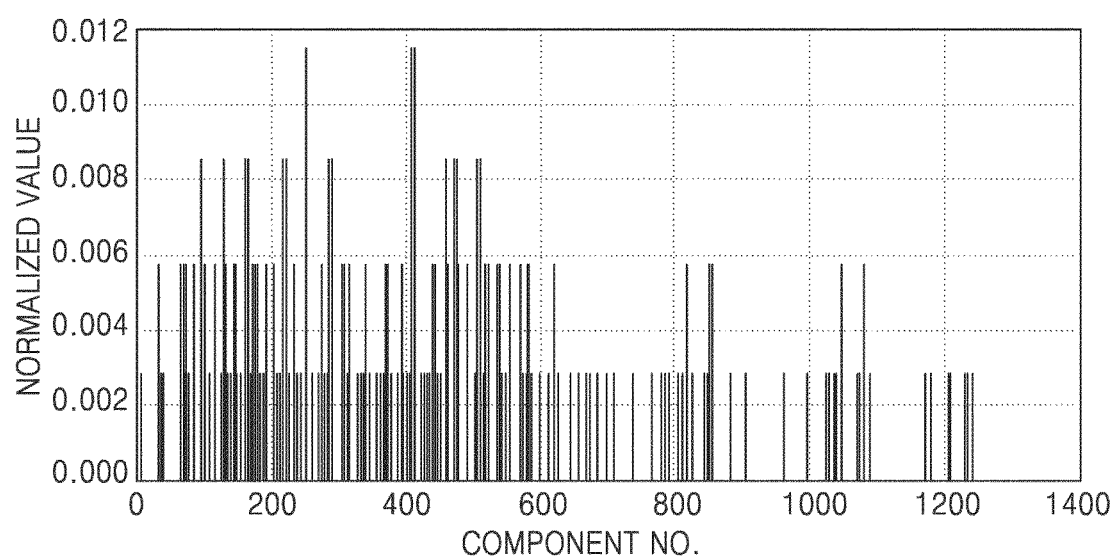
FIG. 10A is a diagram illustrating an example of a Docstrum descriptor calculated with respect to a figure region of interest of FIG. 8 according to an embodiment of the disclosure.

FIG. 10A illustrates a Docstrum Descriptor calculated with respect to the figure region of interest of FIG. 8 according to an embodiment of the disclosure.

Figure 10B:
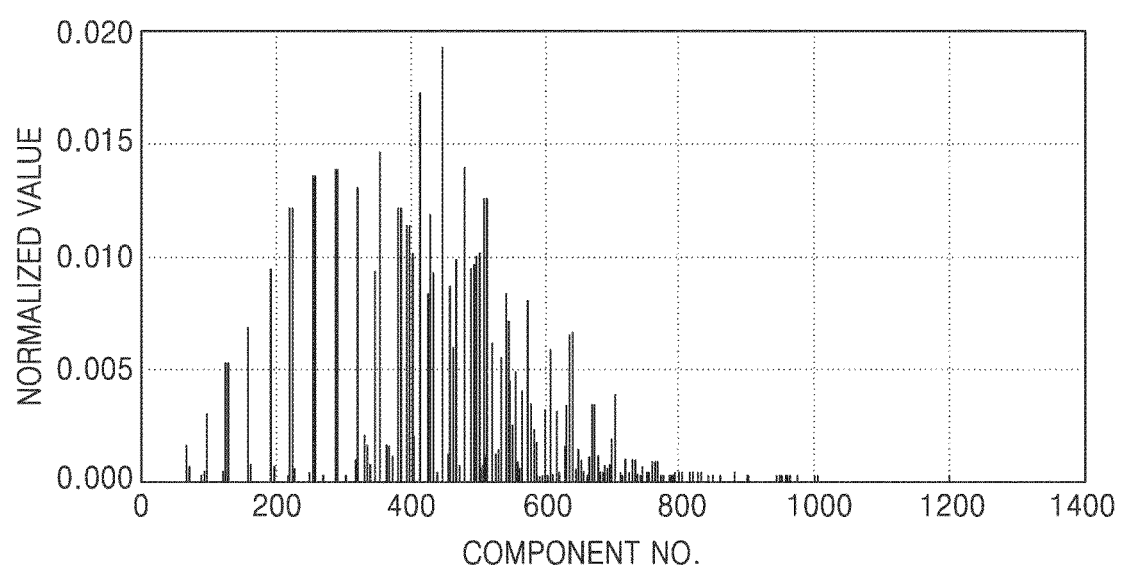
FIG. 10B is a diagram illustrating an example of a Docstrum descriptor calculated with respect to the text region of interest of FIG. 9 according to an embodiment of the disclosure.

FIG. 10B illustrates a Docstrum Descriptor calculated with respect to the text region of interest of FIG. 9 according to an embodiment of the disclosure.

Referring to FIGS. 10A and 10B, a 2D histogram of a typical text region of interest according to an embodiment includes a peak having regular intervals, unlike a histogram of a figure region of interest.

Meanwhile, according to another embodiment, by further reducing sizes of a region of interest and a 2D histogram bin, a descriptor dimension (and complexity of descriptor calculation and processing) may be reduced.

For example, in an embodiment with 16 angle bins and 20 distance bins, feature vectors of 320 dimensions may be generated. Docstrum Descriptors respectively applied to the regions of interest adjusted to have a size of 300 pixels by 300 pixels based on the regions of interest of FIGS. 8 and 9 are respectively illustrated in FIGS. 11A and 11B.

Figure 11A:
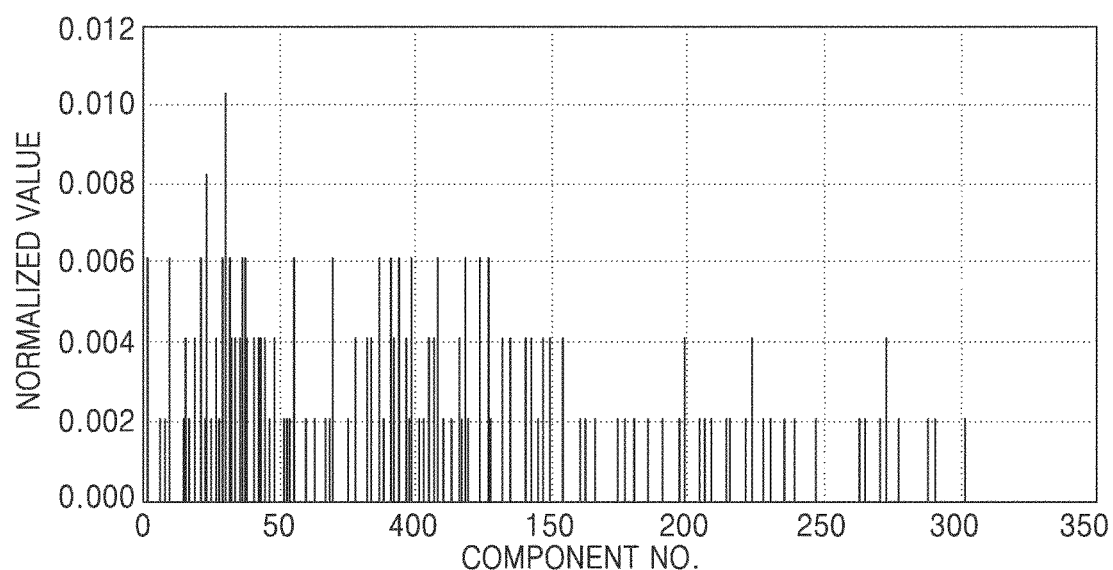
FIG. 11A is a diagram illustrating an example of a Docstrum descriptor calculated with respect to a figure region of interest of FIG. 8 after resizing the figure region of interest, according to an embodiment of the disclosure.

FIG. 11A is a diagram illustrating an example of a Docstrum descriptor calculated with respect to the figure region of interest of FIG. 8 after resizing the figure region of interest, according to an embodiment of the disclosure.

Figure 11B:
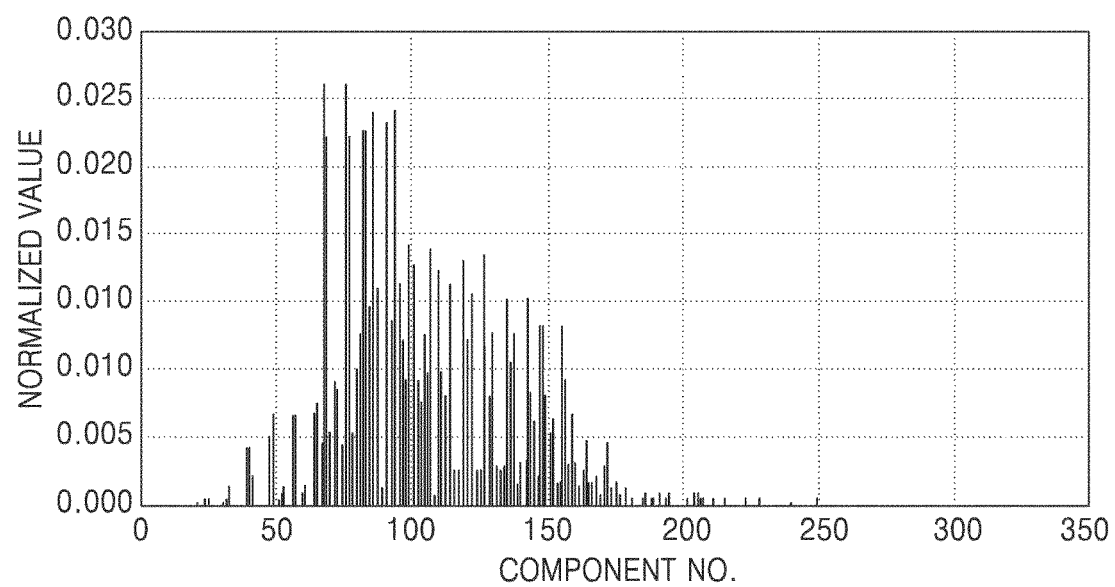
FIG. 11B is a diagram illustrating an example of a Docstrum descriptor calculated with respect to a text region of interest of FIG. 9 after resizing the text region of interest, according to an embodiment of the disclosure.

FIG. 11B is a diagram illustrating an example of a Docstrum descriptor calculated with respect to the text region of interest of FIG. 9 after resizing the text region of interest, according to an embodiment of the disclosure.

However, determination capability of a Docstrum Descriptor with respect to a setting for reducing sizes of a region of interest and a histogram bin may decrease accordingly. Here, a histogram with respect to a text region of interest may have a relatively less regular structure.

Figure 5:
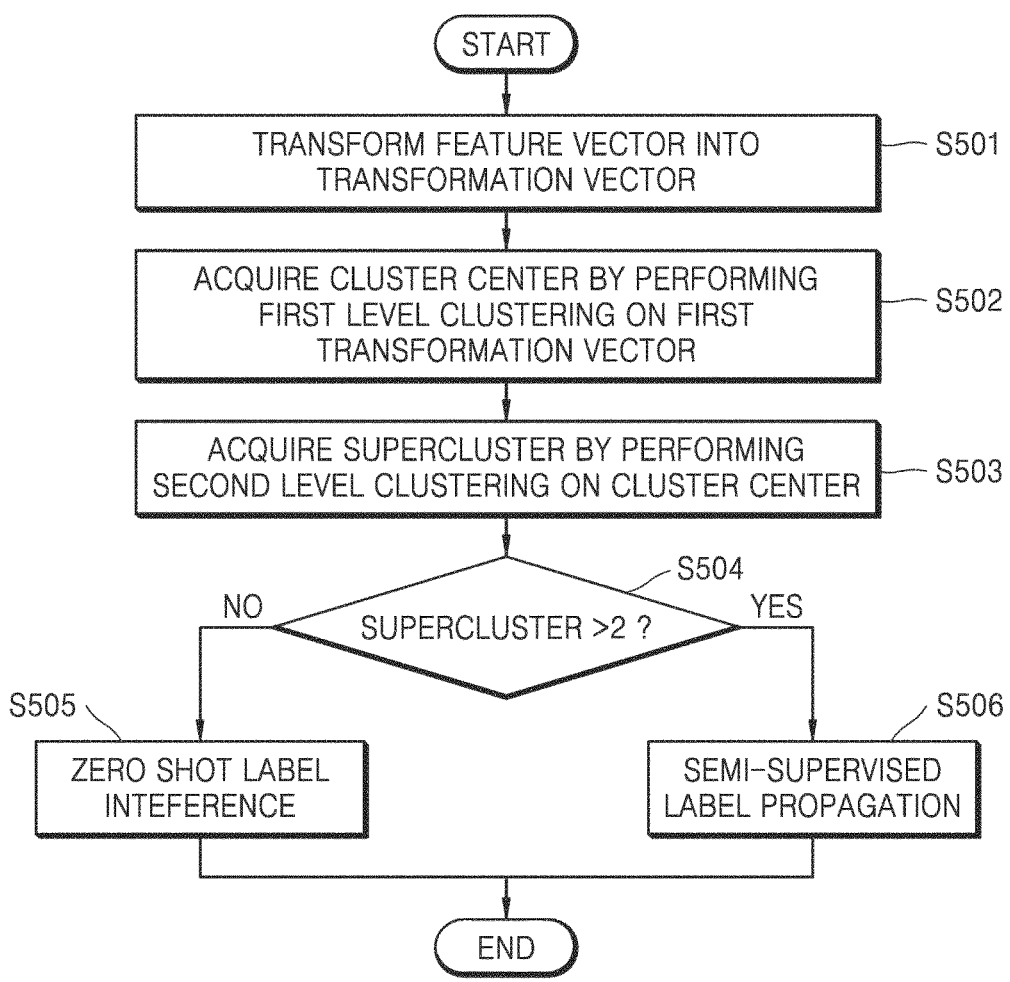
FIG. 5 is a flowchart sequentially illustrating a method of acquiring a cluster by performing clustering on a feature vector according to an embodiment of the disclosure.

FIG. 5 is a flowchart sequentially illustrating a method of acquiring a cluster by performing clustering on a feature vector according to an embodiment of the disclosure.

Referring to FIG. 5, a processor transforms a feature vector into a first transformation vector by using kernel-approximating feature mapping.

A kernel refers to a positive (+) function that is appropriate to represent a probability distribution that is symmetrical with respect to a generalized scalar product, that is, an origin, and has real values defined with respect to shape vector pairs, but is not necessarily linear.

While kernel-approximating feature mapping is optional, a descriptor according to the disclosure is used in solving a learning issue regarding large data through kernel-approximating feature mapping, and thus, is distinguished from a classification method that uses a descriptor according to the related art.

A Docstrum Descriptor is a histogram, and thus, a Euclidean distance (or a scalar product) used in a clustering operation with respect to a feature vector is not appropriate as a measure for feature vector proximity.

Examples of kernels of a histogram-based descriptor widely used in computer vision and machine learning application programs include the Hellinger's kernel, $\chi^2$ kernel, intersection kernel, Jensen-Shannon kernel, or the like, and definitions of the kernels and corresponding distances of the kernels are shown in Table 1.

TABLE 1

| Kernel | K(x, y) | $D^2(x, y) =$ $K(x, x) + K(y, y) - 2K(x, y)$ |
|---|---|---|
| Hellinger | $\sum_i \sqrt{x_i} \sqrt{y_i}$ | $\sum_i (\sqrt{x_i} - \sqrt{y_i})^2$ |
| Intersection | $\sum_i \min(x_i, y_i)$ | $\sum_i |x_i - y_i|$ |
| $\chi^2$ | $\sum_i \frac{2 x_i y_i}{x_i + y_i}$ | $\sum_i \frac{(x_i - y_i)^2}{x_i + y_i}$ |
| Jensen-Shannon | $\sum_i \frac{x_i}{2} \log_2 \frac{x_i + y_i}{x_i} + \frac{y_i}{2} \log_2 \frac{x_i + y_i}{y_i}$ | $KL\left(x \mid \frac{x+y}{2}\right) + KL\left(y \mid \frac{x+y}{2}\right)$ |
| Jaccard | $\frac{\sum_i \min(x_i, y_i)}{\sum_i \max(x_i, y_i)}$ | $2 - 2 \frac{\sum_i \min(x_i, y_i)}{\sum_i \max(x_i, y_i)}$ |

In a first level clustering operation in which a mini-batch k-means which will be described later is used, only an Euclidean distance between feature vectors may be used, and thus, the feature vectors are to be transformed by using appropriate kernel-approximating feature mapping.

The kernel-approximating feature mapping may be defined as $\Psi: \mathfrak{R}^D \rightarrow \mathfrak{R}^N$ with respect to arbitrary x and y values, x, y$\in \mathfrak{R}^D$: K(x, y)$\approx \langle \Psi(x), \Psi(y) \rangle$, and a linear (Euclidean) scalar product of the transformed feature space $\mathfrak{R}^N$ approximates a non-linear kernel K (x, y) in a previous, untransformed feature space $\mathfrak{R}^D$.

Here, the positive (+) kernel K(x, y) corresponds to a distance D(x, y) given by the formula $D^2(x, y)=K(x, x)+K(y, y)-2K(x, y)$, and thus, when $\|\cdot\|^2$ represents a square of an Euclidean distance on $\mathfrak{R}^N$, x, y$\in \mathfrak{R}^D$: $D^2(x, y) \approx \|\Psi(x),$ $\Psi(y)\|^2$, and consequently, a distance corresponding to the kernel may also be approximated through feature mapping in a same manner.

Hellinger's kernel, $\chi^2$ kernel, intersection kernel and Jensen-Shannon kernel are all additive and $\gamma$-homogeneous, and thus, approximating feature mapping of these kernels may be induced in an analytical form.

For example, in the Hellinger's kernel, exact dimension-maintaining mapping where a square root of each component is taken is used, whereas in the $\chi^2$ kernel, intersection kernel, and Jensen-Shannon kernel, dimension-changing mapping of $\Psi: \Re^{1280} \to \Re^{6400}$, (5×1280) is used.

Meanwhile, unlike other histogram-based kernels, the Jaccard kernel is not additive nor $\gamma$-homogeneous, and thus, it is relatively difficult to induce feature mapping approximated in an analytical form.

Figure 12:
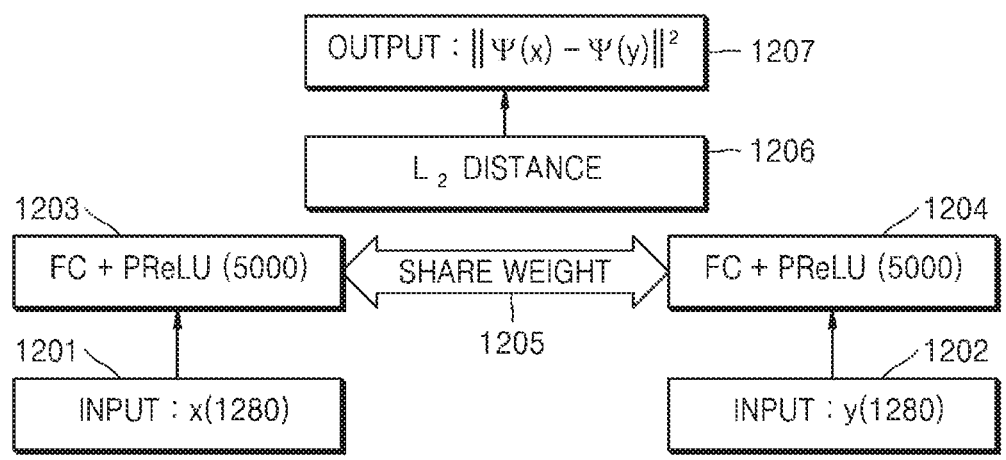
FIG. 12 is a diagram illustrating an example of a Siamese neural network for learning Jaccard kernel-approximating feature mapping, according to an embodiment of the disclosure.

Accordingly, the processor according to an embodiment may use a Siamese neural network to learn Jaccard kernel-approximating feature mapping, and a structure of the Siamese neural network is illustrated in FIG. 12.

FIG. 12 is a diagram illustrating an example of a Siamese neural network for learning Jaccard kernel-approximating feature mapping, according to an embodiment of the disclosure.

Referring to FIG. 12, operations that are shaded in the Siamese neural network share a weight and configure $\Psi$ feature mapping that is trained by the neural network. Layer output dimension according to an embodiment is illustrated in the parentheses of FIG. 12.

The Siamese neural network may receive two Docstrum feature vectors x and y (each corresponding to 1280 dimensions) which are arbitrarily selected (e.g., at operations 1201 and 1202).

The two feature vectors x and y are supplied to a fully-connected (FC) layer having a parametric rectified linear unit (PReLU) activation and 5000 outputs (e.g., at operations 1203 and 1204).

The two layers, the FC+PReLU layers, share all weights during learning, and thus, each layer performs the same feature mapping of $\Psi: \Re^{1280} \to \Re^{5000}$ which is currently actually trained in a neural network (e.g., at operation 1205).

Outputs $\Psi(x)$ and $\Psi(y)$ of the two layers, FC+PReLU layers, are used to calculate a square Euclidean distance, $\|\Psi(x)-\Psi(y)\|^2$ (e.g., at operation 1207), and transmitted to a $L_2$ distance calculation layer that does not include trainable parameter (e.g., at operation 1206), and a square distance obtained as a result of the calculation corresponds to an output of the Siam neural network.

While a square distance $D^2(x, y)$ of the Jaccard kernel distance is used as a target output during learning, a mean absolute percentage error (MAPE) is used in a learning loss function.

A weight of a FC layer may be initialized through Glorot uniform initialization, and a PReLU parameter may be initialized to 0, and Nesterov ADAM may be used as an optimization algorithm.

The Siamese neural network may be trained during three hundred epochs by using a batch size of 10,000 feature vector pairs, and achieve a test accuracy of 7% (MAPE) at a Jaccard distance approximation value, and this accuracy is similar to those of other kernels.

In a subsequent operation of processing feature vectors after kernel-approximating feature mapping, a Euclidean distance (also referred to as a linear kernel) is used, and kernel approximating is not used.

Referring back to FIG. 5, the processor performs first level clustering on the first transformation vector that to acquire a cluster center at operation S502.

According to an embodiment, for rapid training that is suitable for large data, the processor may perform first level clustering by using a mini-batch k-mean algorithm to acquire a cluster center with respect to the first transformation vector.

The mini-batch k-mean algorithm is suitable for large-scale processing and has a good general quality of resultant clustering.

However, like a standard k-mean algorithm, the mini-batch k-mean algorithm is not able to accurately process a non-convex cluster or an extended cluster.

The above hypothesis may be determined by performing k-mean clustering configured to output a relatively small number of clusters (for example, 2 to 10) to a transformed Docstrum Descriptor and visually inspecting a region of interest corresponding to a feature vector of a resultant cluster.

In particular, this inspection shows that the resultant cluster does not dominate explicitly any one class but includes both a text region of interest and a figure region of interest.

However, as the number of requested clusters is relatively large, the k-means algorithm may easily segment a non-convex or extended text/figure cluster into smaller convex and isotropic sub-clusters, and thus, when the number of clusters is increased to twenty or more, an output cluster is dominated by a text region of interest or a figure region of interest.

According to an embodiment, by changing the number of clusters from 2 to 1,000 and visually inspecting a result of k-means clustering, it is shown that one hundred clusters maintain an optimal balance between a cluster mean and computational complexity of the k-means clustering.

In a preferred embodiment, the processor may acquire one hundred clusters and their centers through first level clustering by using a mini-batch k-means algorithm.

As described above, in an operation of performing first level clustering, a mini-batch k-means algorithm configured to output one hundred clusters in a mini-batch size corresponding to one thousand feature vectors with respect to one hundred epochs is performed.

Text clusters and figure clusters respectively consist of text or a figure only at a rate close to 100% (i.e., including only a region of interest of one of a text and a figure), whereas a typical mixed cluster is dominated by one class and may include impurities of other classes at up to 30%.

According to an embodiment, manual analysis of mixed clusters has shown that the mixed clusters include less than 10% of all functional vectors of descriptive datasets and a total impurity percentage is less than 3%, which is safely negligible in the context of the objective of the disclosure.

Thus, for further processing and analysis, it is assumed that sufficiently pure text clusters and figure clusters may be output from first level clustering.

According to an embodiment, a smallest amount of impurities is obtained when using the Jaccard kernel; impurities of a relatively high ratio are obtained when using the $\chi^2$ kernel and the Jensen-Shannon kernel; and impurities of a highest ratio are obtained when the intersection kernel and the linear kernel are used.

Meanwhile, although the Hellinger's kernel does not provide benefits in terms of performance benefits, as better clustering results are obtained from the Hellinger's kernel, and thus the Hellinger's kernel is not used in the disclosure.

Referring back to FIG. 5, the processor acquires a supercluster by performing second level clustering on the cluster center at operation S503.

The second-level clustering is used to improve search capability in a unique data structure in feature space, and may provide more accurate text/figure separation capability.

K-means clustering used in the first-level clustering operation outputs convex isotropic clusters, and as these cluster geometries are not Docstrum feature vector clusters corresponding to a text region of interest and a figure region of interest, clusters are to be aggregated into a supercluster by a clustering algorithm capable of dealing with non-convex, non-isotropic clusters.

As most of these clustering algorithms are less scalable than large datasets, they are not applied to actual feature vectors but to a center of clusters output by the first level clustering.

That is, the number of centers of clusters output by the first-level clustering is 100 (or less), and thus, application of a second-level clustering algorithm is not restricted by the requirements for processing large data sets.

In an embodiment, algorithms used by the processor in the second level clustering operation may include a k-means++ algorithm that uses an initial value of a k-means algorithm, an affinity propagation clustering algorithm, an agglomerative clustering algorithm, a mean shift clustering algorithm, a balanced iteration reduction and hierarchical clustering (BIRCH) algorithm, a density-based space clustering of noisy applications (DBSCAN) algorithm, a hierarchical DBSCAN (HDBSCAN), a single class support vector machine (SVM) algorithm, and a spectral clustering algorithm.

In the $\chi^2$ kernel, the intersection kernel, the Jensen-Shannon kernel, and the Jaccard kernel, transformed feature space has a dimension that is several times higher than an original Docstrum Descriptor, and thus, first-level clustering on these kernels takes the longest time during the entire process, and requires about two to three times longer compared to the linear kernel (i.e., the kernel for the original Docstrum feature vector).

Thus, one method to improve computational performance in the clustering operation is to skip transforming a feature vector to a first transformation vector through kernel-approximating feature mapping and performing second level clustering by using one of histogram-based kernels.

A size of a matrix with respect to a center of a cluster output by the first-level clustering is much smaller than a size of an input large data set, such computational performance improvement may be achieved by using a kernel matrix (or a distance matrix with respect to a distance-based algorithm) instead of a feature vector.

An exact kernel transformation may use a same kernel as an approximate kernel transformation.

An exact kernel transformation uses an exact kernel or distance with respect to Docstrum feature vector pairs, unlike an approximate kernel transformation.

In an exact kernel transformation, a kernel/distance matrix may be directly computed as a matrix of kernel/distance paired to a center of all pairs obtained by the mini-batch k-means method (where Kij=K(ci, cj), and (exact) Kij is a matrix component corresponding to an intersection of an ith row and a jth column included in the kernel/distance matrix, and K(ci, cj) is a kernel/distance of an ith center point and a jth center point), and the computed matrix may be directly input to a second level clustering algorithm.

Here, the processor may use a kernel matrix with respect to some of algorithms used to perform second level clustering (all algorithms except the DBSCAN algorithm and the HDBSCAN algorithm), and may use a distance matrix with respect to the remaining algorithms, that is, the DBSCAN algorithm and the HDBSCAN algorithm.

The processor may use both an exact kernel transformation and an approximate kernel transformation. An operational result of each transformation and comparison of performances thereof will be described later.

Meanwhile, the processor according to an embodiment may modify most important parameters in a relatively broad range to discover a combination of parameter values having optimum performance in terms of precision, recall, and $F_1$ score with respect to each of the algorithms used in second level clustering.

Table 2 below shows parameters of second-level clustering algorithms and ranges of the parameters.

TABLE 2

| Algorithm | Parameter | Range | Description |
|---|---|---|---|
| Affinity propagation | DF | 0.5 ÷ 1 | Damping factor |
| Agglomerative clustering[2] | $N_{clusters}$ | 2 ÷ 100 | Number of clusters to find |
|  | $K_{neighbors}$ | 1 ÷ 20 | Number of nearest neighbors for connectivity matrix computation |
| BIRCH | RT | $10^{-4}$ ÷ 0.5 | Subcluster radius threshold for new subcluster creation |
|  | BF | 2 ÷ 20 | Maximum number of subclusters in each node |
|  | $N_{clusters}$ | 2 ÷ 50 | Number of clusters after the final clustering operation |
| DBSCAN | ε | $10^{-3}$ ÷ 1 | Radius of sample neighborhood |
|  | $N_{samples}$ | 1 ÷ 30 | Number of samples in core point's neighborhood |
| HDBSCAN | $N_{minsize}$ | 2 ÷ 30 | Minimal size of cluster |
|  | $N_{samples}$ | 1 ÷ 30 | Number of samples in core point's neighborhood |
| k-means | $N_{clusters}$ | 2 ÷ 50 | Number of clusters to form |
| Mean shift | BW | $10^{-4}$ ÷ 1 | Bandwidth used in the RBF kernel |
| One-class SVM[3] | ν | 0.05 ÷ 0.5 | Upper bound on the fraction of training errors |
|  | γ | 0.2 ÷ 0.8 | Kernel coefficient for the RBF and sigmoid kernels |
| Spectral clustering[4] | $N_{clusters}$ | 2 ÷ 50 | Dimension of the projection subspace |

According to an embodiment, two labeling modes of a supercluster are used according to an output of second level clustering.

Once a supercluster is acquired, the processor determines whether two or more superclusters are acquired or more than two superclusters are acquired at operation S504.

As a result of the determination, when the number of acquired superclusters is two (i.e. not greater than 2), the processor uses a zero-shot label inference operation to classify each supercluster into one of a text class and a figure class at operation S505.

When the number of acquired superclusters is more than two, the processor uses semi-supervised label propagation operation to classify each supercluster into one of classes, a text class and a figure class at operation S506.

In a typical second-level clustering operation, a relatively small number of superclusters are output, and thus, in order to classify a supercluster into a text class or a figure class, additional information sources with respect to the corresponding classes are to be used.

The zero-shot label inference mode does not use labeled data at all, but uses only general prior information of the text or figure region of interest of the data set.

On the other hand, in the semi-supervised label propagation mode, only a small subset (less than 1% of all data) labeled in one class (for example, class of a text region of interest) by using additional information is used. That is, in the semi-supervised label propagation mode, data labeled in only one of two classes of interest may be used.

In the zero shot label inference mode, the processor uses typical statistical information regarding classes.

For example, in the case of an image included in a patent-related document, a ratio of a text region of interest is relatively predominant over a ratio of a figure region of interest, and thus, a larger cluster among two superclusters may be classified as a text region of interest, and a smaller cluster may be classified into a figure region of interest.

On the other hand, in the semi-supervised label propagation mode, a labeled small subset may be used, which is obtained from observations of a plurality of patent-related documents without figures. The patent-related documents without figures may be easily identified from the absence of words such as "fig", "drawing" and "## str" in the entire text (but not limited to these words).

All regions of interest (and corresponding Docstrum feature vectors) of patent-related documents without figures are thus labeled as text regions of interest, and a degree of text contamination of each supercluster is calculated.

Next, supercluster classification is performed, in which a supercluster having text contamination corresponding to a particular threshold value or more is labeled as a text class, and the remaining superclusters are labeled as a figure class.

Here, while a particular threshold value may be set at a percentage of text contamination of all superclusters, percentage values themselves may be variously set from 0% to 100% in addition to the parameters of the second level clustering algorithm.

A patent-related document consisting solely of text includes a text region of interest representing a set of full-text regions of interest (i.e., including all classes of all kinds of text regions unique to a patent-related document, such as heading text, table text, and general text boxes), and thus, such text label propagation is suitable for achieving the objective of the disclosure.

Figure 13:
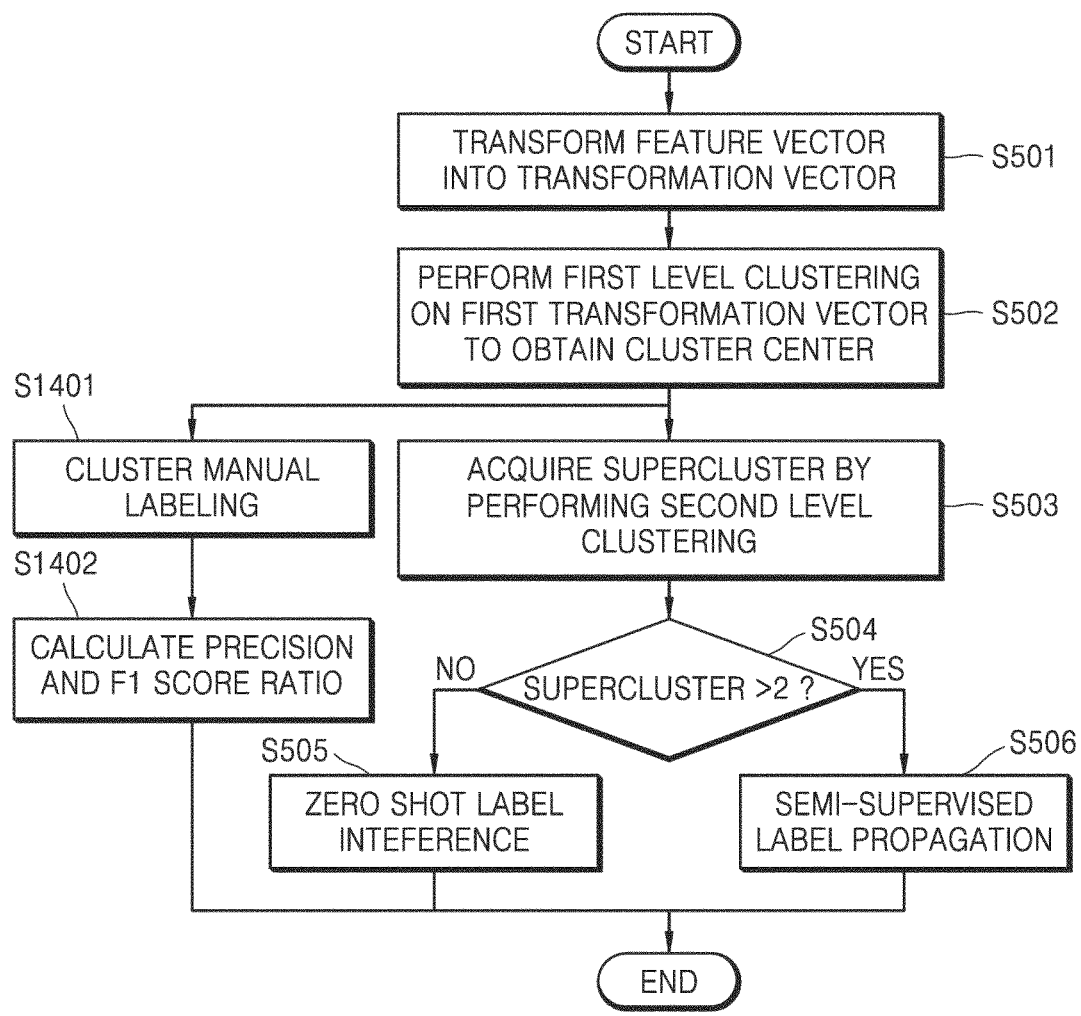
FIG. 13 is a flowchart illustrating an example of a parallel classification performance evaluation path added to the flowchart of FIG. 5 according to an embodiment of the disclosure.

According to an embodiment, in order to evaluate classification performance of the processor to acquire a supercluster, a parallel classification performance evaluation path may be added to the flowchart of FIG. 5 as illustrated in FIG. 13.

FIG. 13 is a flowchart illustrating an example of a parallel classification performance evaluation path added to the flowchart of FIG. 5 according to an embodiment of the disclosure.

Other configurations than the parallel classification performance evaluation path added in FIG. 13 are the same as those of the embodiment described above with reference to FIG. 5, and thus description of the other configurations at operations S501 through S506 is omitted for convenience.

Referring to FIG. 13, a processor according to an embodiment manually labels a cluster in a first evaluation operation at operation S1401.

When the cluster is labeled, the processor compares a predicted label of the cluster with the manually assigned label and recall in the evaluation second operation at operation S1402 to calculate a precision and a ratio of the $F_1$ score.

When a page of a patent-related document is classified as a text or figure page usable in the USPTO or Google Patents, the page of the patent-related document may include regions of interest of both classes, and thus may not accurately represent a region of interest.

Although a figure page includes text elements (e.g., patent number, references and figure titles), patent-related document pages for chemistry often contain chemical components mixed with text regions. Another motivation for not using external ground truth labels is that there may be no external sources of such labels for other types of documents that require separation between text and a figure according to the disclosure.

Thus, for classification performance evaluation, a ground truth label, which is manually generated by visual inspection of a random subset of a region of interest corresponding to each cluster generated in the first level clustering operation, is used as a reference value.

As described above, as most clusters are extensively dominated by a single class (either a text class or a figure class), all regions of interest in such clusters are marked as belonging to a dominant class of the cluster. In addition, according to this approach, incorrect labeling may display an incorrect range within an allowable extent.

When manually labeling all regions of interest of a dataset, a quality of separation between a text and figures is evaluated based on widely used classification performance units such as recall, precision, and $F_1$ score that are calculated by comparing predicted labels and manually designated labels.

However, it should be noted that a result of the evaluation based on the classification performance units is approximate as a range may be misrepresented within the allowable extent as described above. In addition, it should also be noted that while manual labeling is used only for classification performance evaluation and searching for optimal parameters of this disclosure, the manual labeling method itself is completely automatic and does not rely on any manual operation.

Hereinafter, the classification performance evaluation method according to the embodiment of FIG. 13 and evaluation results thereof will be described in detail.

First, in an embodiment, the classification performance evaluation method uses a method implemented in Python by using the NumPy/SciPy package.

Here, Scikit learning and fastcluster are used in the kernel approximating and clustering operations, and a Keras library is used for construction and learning of the Siamese neural network, and data about images and descriptors are stored in HDF5 format by using the PyTables package, and scikit images are used in image processing.

Meanwhile, such a test system includes an 8-core AMD FX-8350 CPU and an NVIDIA GeForce GTX 780 GPU (used to train neural networks).

A data set used in experiments consists of 12,100 patent-related documents between 2005 and 2013, randomly selected and downloaded from the website of the USPTO, and there are no restrictions on patent themes. According to this approach, a wide variety of patent-related figures in a wide variety of areas (electronics, construction, machinery, and chemistry) may be computed.

In the operation of dividing a document image into a plurality of regions of interest according to the disclosure, a total of 1.1 million regions of interest are extracted from pages of the patent-related documents, and only 197 out of 12,100 patents are text-only patents, and 10,458 text regions of interest are extracted from the text-only patents (less than 1% of all regions of interest).

From among operations of the classification performance evaluation method according to an embodiment, the most time-consuming operation is training the Siamese neural network (about 20 hours or more) to obtain approximating feature mapping with respect to the Jaccard kernel.

In addition, transformation of a Docstrum feature vector, in which Docstrum descriptor calculation and kernel-approximating feature mapping are used, requires about 1.5 hours, and first level clustering takes about 3 hours for a linear kernel, about 7 hours for each of the $\chi^2$ kernel, the intersection kernel, and the Jensen-Shannon kernel, and it takes about 10.5 hours for the Jaccard kernel.

On the other hand, second level clustering and the classification operation of the supercluster take a negligibly short period of time in comparison with the previous operations (especially when a nonlinear kernel is used).

To obtain classification performance results, classification performance of the approximate kernel transformation is evaluated with respect to all combinations of parameters associated with the sub-operations of the second-level clustering (see Table 2) and classification of superclusters. The total number of combinations of parameters tried for the transformation is 406,665.

Referring to Table 3, classification performance evaluation results of the processor according to an embodiment is shown.

Each table cell contains a result ($F_i$, precision, and recall) with respect to combinations of parameters providing a highest $F_1$ score for a corresponding pair of second-level clustering and an approximate kernel algorithm (shown in rows and columns of Table 3, respectively).

kernel for all second-level clustering algorithms, according to a preferred embodiment of the disclosure, as a first sub-operation of classifying an extracted feature vector into one class, text or a figure, a transformation that approximates one of the non-linear kernels may be used.

Figure 14A:
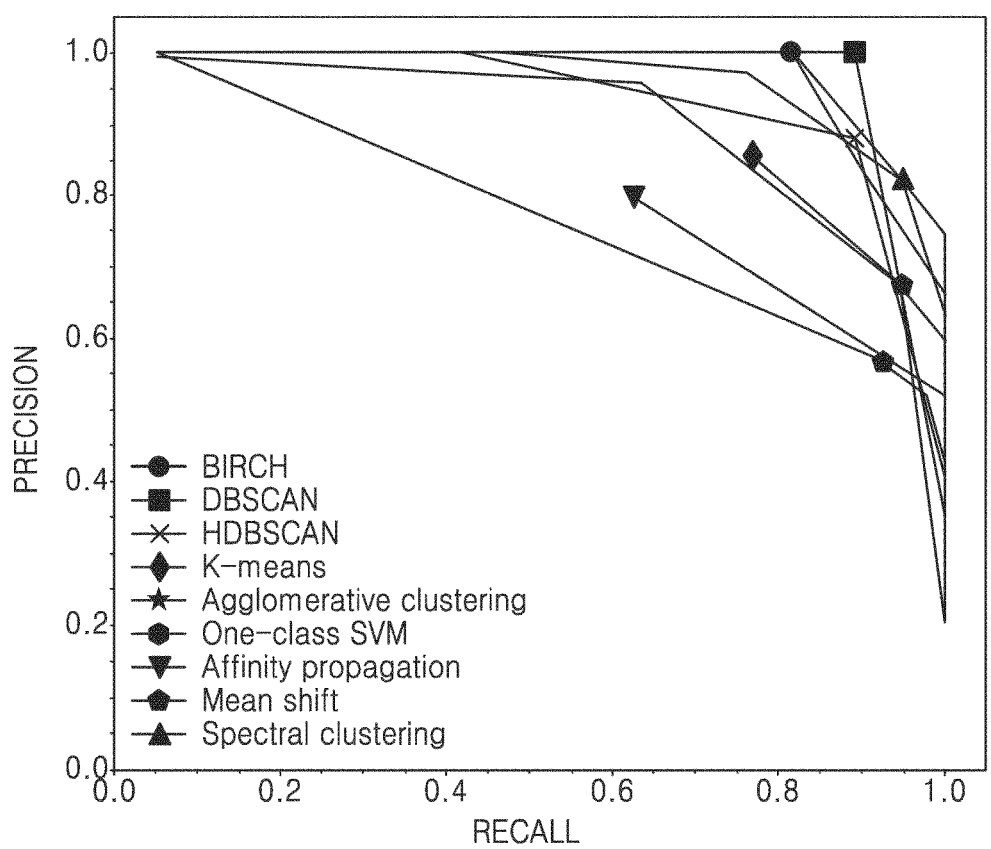
FIG. 14A is a graph showing a precision-recall curve with respect to an approximated kernel transformation according to an embodiment of the disclosure.
Figure 14B:
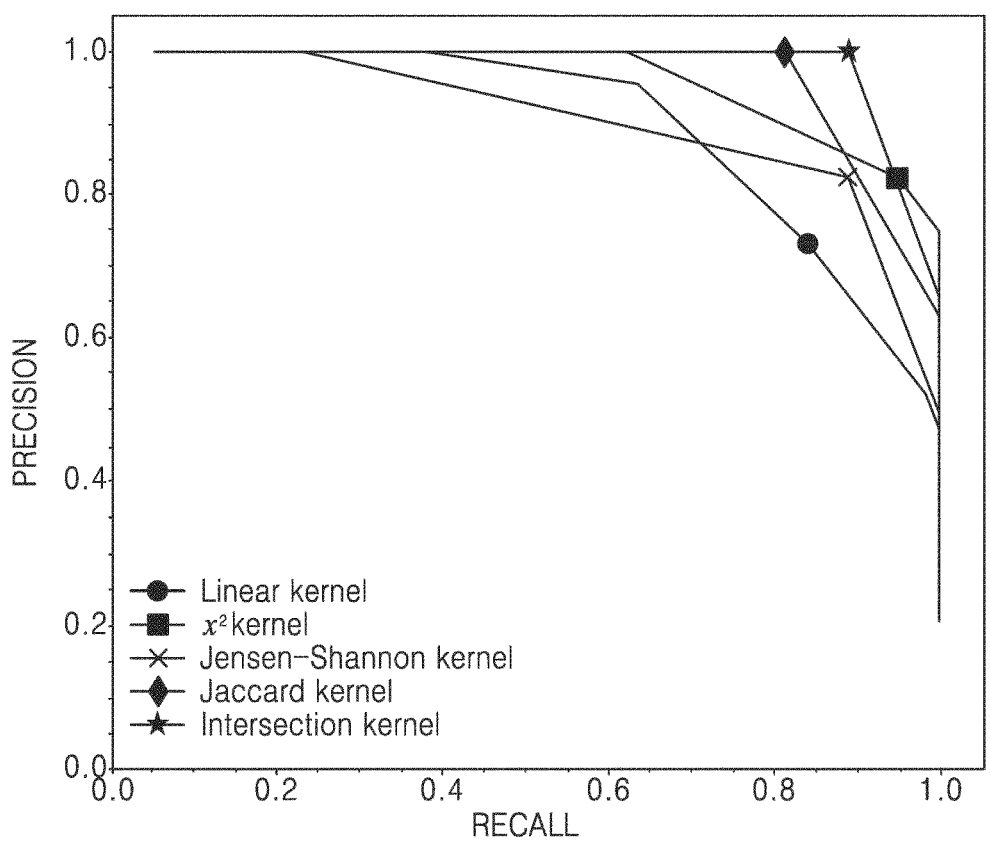
FIG. 14B is a graph showing a precision-recall curve with respect to an approximated kernel transformation according to an embodiment of the disclosure.

FIGS. 14A and 14B are graphs showing a precision-recall curve with respect to approximated kernel transformation, which support conclusions on the evaluation results of Table 3, according to various embodiments of the disclosure.

Referring to FIGS. 14A and 14B, a convex hull of all precision precision-recall points associated with each algorithm (or each kernel) is obtained with respect to each second level clustering algorithm (or each kernel approximating) to visualize the precision-recall results, and an upper right segment of the convex hull corresponds to a segment with best results, i.e., a segment with a relatively high degree of precision and recall.

Three best case results (underlined in Table 3), namely, DBSCAN using the intersection kernel, spectral clustering using the $\chi^2$ kernel, and agglomerative clustering using the $\chi^2$ kernel were selected for further analysis.

Although some of parameter combinations with respect to second-level clustering and an approximate kernel algorithm pairs provide a better $F_1$ score than the latter two results, no improvement is made over the DBSCAN algorithm using

TABLE 3

|  | $\chi^2$ | Intersection | Jaccard | Jensen-Shannon | Linear |
|---|---|---|---|---|---|
| Affinity Propagation | 0.68<br>0.52  1.00 | 0.68<br>0.64  0.73 | 0.70<br>0.80  0.63 | 0.63<br>0.48  0.91 | 0.53<br>0.41  0.76 |
| Agglomerative Clustering | 0.86<br>complete linkage<br>0.75  1.00 | 0.75<br>mean linkage<br>0.62  0.96 | 0.90<br>Ward linkage<br>1.00  0.81 | 0.76<br>Ward linkage<br>0.67  0.87 | 0.65<br>Ward linkage<br>0.48  1.00 |
| BIRCH | 0.77<br>0.65  0.95 | 0.81<br>0.70  0.96 | 0.90<br>1.00  0.81 | 0.79<br>0.72  0.87 | 0.68<br>0.53  0.96 |
| DBSCAN | 0.80<br>0.94  0.70 | 0.94<br>1.00  0.89 | 0.78<br>0.72  0.86 | 0.86<br>0.82  0.89 | 0.70<br>0.87  0.58 |
| HDBSCAN | 0.68<br>0.67  0.70 | 0.89<br>0.88  0.89 | 0.81<br>0.75  0.87 | 0.76<br>0.72  0.80 | 0.64<br>0.67  0.62 |
| K-Means | 0.75<br>0.60  1.00 | 0.78<br>0.66  0.96 | 0.81<br>0.85  0.77 | 0.68<br>0.56  0.87 | 0.68<br>0.56  0.88 |
| Mean shift | 0.70<br>0.57  0.93 | 0.66<br>0.51  0.94 | 0.64<br>0.47  0.98 | 0.65<br>0.54  0.82 | 0.61<br>0.48  0.85 |
| One-class SVM | 0.79<br>RBF<br>0.68  0.95 | 0.73<br>sigmoid<br>0.70  0.77 | 0.60<br>RBF<br>0.51  0.75 | 0.69<br>RBF<br>0.58  0.85 | 0.76<br>sigmoid<br>0.96  0.64 |
| Spectral Clustering | 0.88<br>0.82  0.95 | 0.85<br>0.89  0.81 | 0.87<br>0.83  0.91 | 0.76<br>0.73  0.80 | 0.78<br>0.73  0.84 |

Referring to Table 3, from among tested kernels, best results are provided by the Jaccard kernel and the $\chi^2$ kernel, while from among the second level clustering algorithms, best results are provided by BIRCH, DBSCAN, HDBSCAN and spectral clustering algorithms.

In addition, by using the DBSCAN algorithm and the intersection kernel, an overall best result may be obtained, and this combination may be used in a preferred embodiment of the disclosure in which kernel approximation is used.

As use of a linear kernel results in a relatively low classification performance compared to use of a non-linear the intersection kernel in terms of precision and recall, and agglomerative clustering that uses the $\chi^2$ kernel provides a better recall, and spectral clustering that uses the $\chi^2$ kernel provides a good trade-off between the two modules.

A total number of parameter combinations attempted for an exact kernel transformation of the embodiment is 438,170, and Table 4 below shows results of classification performance evaluation of the kernel transformations. In cells for each pair of second-level clustering and an approximate kernel algorithm in Table 4, an upper end shows the $F_1$ score, the bottom left shows precision, and the bottom right shows recall.

TABLE 4

| | $\chi^2$ | | Hellinger | | Intersection | | Jaccard | | Jensen-Shannon | | Linear | |
|---|---|---|---|---|---|---|---|---|---|---|---|---|
| Affinity Propagation | 0.67 | | 0.70 | | 0.74 | | 0.74 | | 0.67 | | 0.53 | |
| | 0.53 | 0.90 | 0.57 | 0.92 | 0.64 | 0.88 | 0.64 | 0.88 | 0.53 | 0.90 | 0.41 | 0.76 |
| Agglomerative Clustering | 0.94 single linkage | | 0.94 single linkage | | 0.94 single linkage | | 0.94 single linkage | | 0.94 single linkage | | 0.65 Ward linkage | |
| | 0.99 | 0.89 | 1.00 | 0.89 | 0.99 | 0.89 | 0.99 | 0.89 | 0.99 | 0.89 | 0.48 | 1.00 |
| DBSCAN | 0.93 | | 0.93 | | 0.89 | | 0.89 | | 0.83 | | 0.70 | |
| | 1.00 | 0.86 | 1.00 | 0.86 | 1.00 | 0.81 | 1.00 | 0.81 | 1.00 | 0.86 | 0.87 | 0.58 |
| HDBSCAN | 0.76 | | 0.78 | | 0.68 | | 0.68 | | 0.78 | | 0.64 | |
| | 0.69 | 0.85 | 0.73 | 0.85 | 0.56 | 0.87 | 0.56 | 0.87 | 0.73 | 0.85 | 0.67 | 0.62 |
| One-class SVM | 0.34 | | 0.29 | | 0.41 | | 0.42 | | 0.32 | | 0.66 | |
| | 0.26 | 0.50 | 0.22 | 0.42 | 0.26 | 0.97 | 0.27 | 0.97 | 0.24 | 0.50 | 0.63 | 0.68 |
| Spectral Clustering | 0.87 | | 0.84 | | 0.90 | | 0.93 | | 0.87 | | 0.78 | |
| | 0.87 | 0.87 | 0.72 | 1.00 | 0.88 | 0.92 | 0.94 | 0.92 | 0.87 | 0.87 | 0.73 | 0.84 |

Referring to Table 4, it is easy to see that highest classification performance is provided by the Jaccard kernel, the $\chi^2$ kernel, Hellinger's kernel, and the Jensen-Shannon kernel.

Figure 15A:
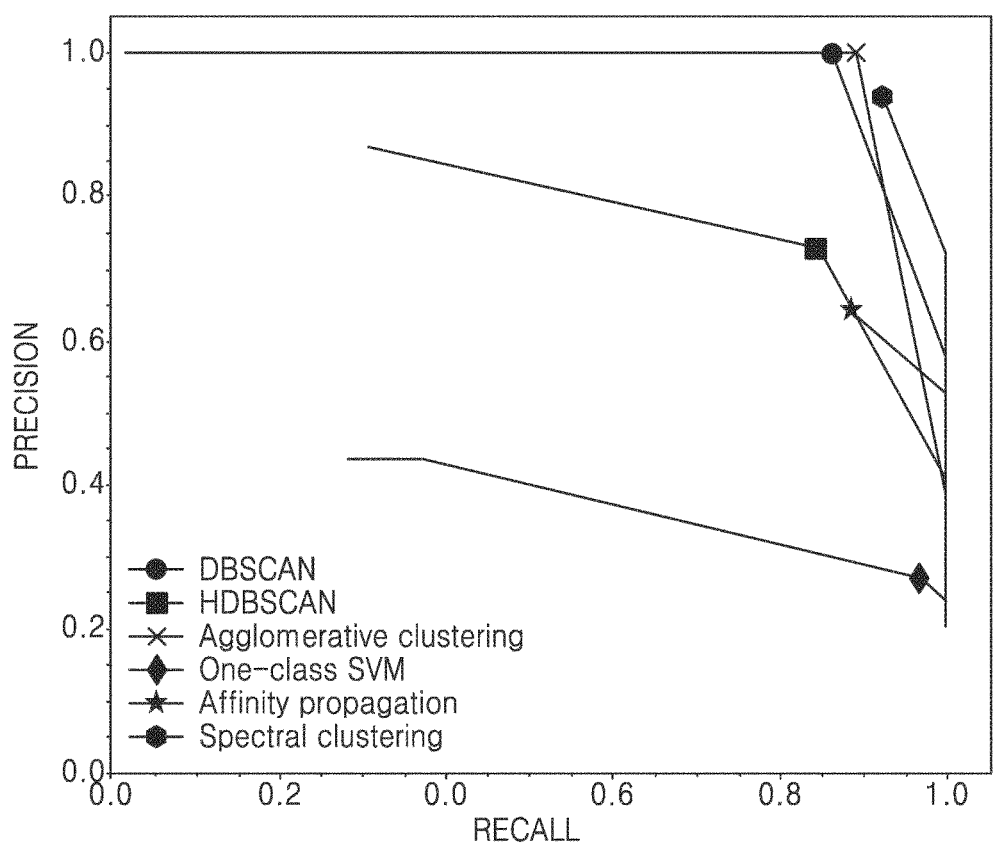
FIG. 15A is a graph showing a precision-recall curve with respect to an exact kernel transformation according to an embodiment of the disclosure.
Figure 15B:
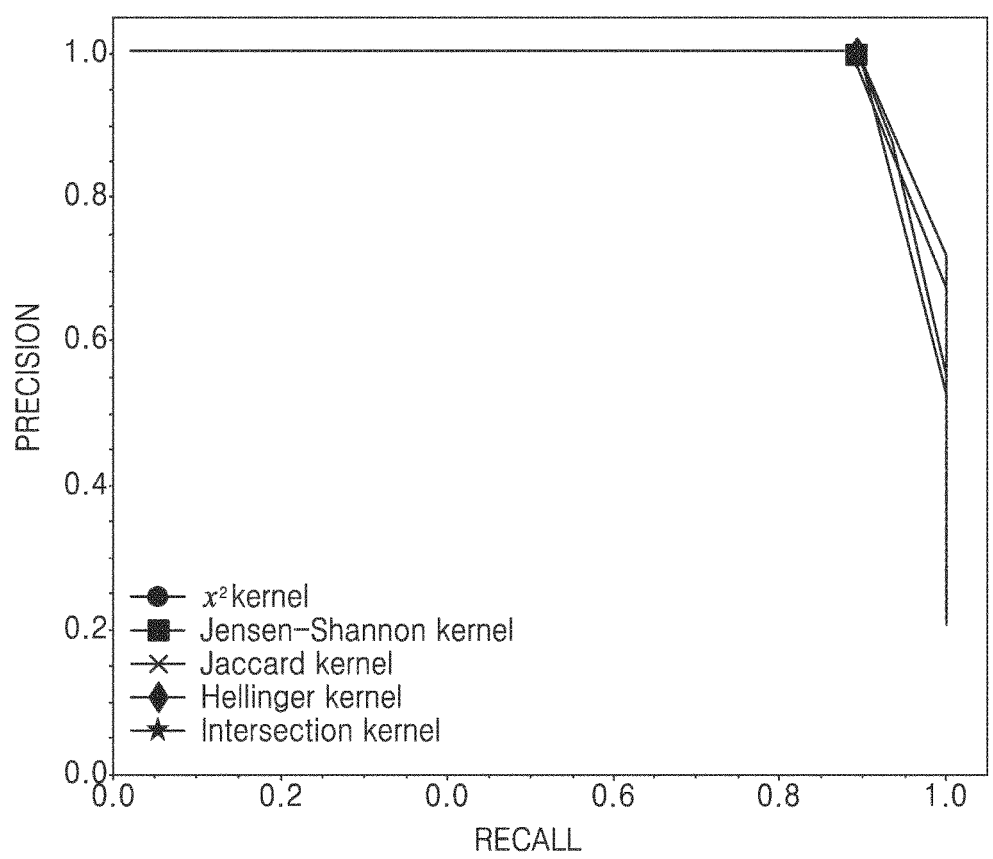
FIG. 15B is a graph showing a precision-recall curve with respect to an exact kernel transformation according to an embodiment of the disclosure.

FIGS. 15A and 15B are graphs showing a precision-recall curve with respect to an exact kernel transformation according to various embodiments of the disclosure.

Results shown in FIGS. 15A and 15B indicate that an exact kernel transformation may be an alternative to the approximate kernel transformation as first-level clustering, which takes the longest time in a linear kernel, is performed twice as fast as a non-linear kernel.

First-level clustering that uses linear kernels (used in exact kernel transformation) yields a relatively large number of mixed clusters compared to when using non-linear kernels, and thus, for subsequent analysis, three optimal performance configurations from among all of the configurations that tried approximate kernel transformations were selected.

Not only supercluster classification parameters (percentiles) that provide best results in the approximate kernel transformation but also a summary of second-level clustering algorithm parameters are given in Table 5 below.

TABLE 5

| $2^{nd}$ Level Clustering Algorithm | Approximated Kernel | $2^{nd}$ Level clustering Parameters | Selected Figure Regions of Interest (ROIs), % | Percentile value, % | $F_1$ Precision | Recall |
|---|---|---|---|---|---|---|
| Agglomerative Clustering | $\chi^2$ | $N_{clusters} = 2$ Complete linkage | 28 | 0 | 0.86 0.75 | 1.00 |
| Spectral Clustering | $\chi^2$ | $N_{clusters} = 10$ Labeling strategy: k-means | 23 | 12.5 | 0.88 0.82 | 0.95 |
| DBSCAN | Intersection | $\varepsilon = 0.43$ ($N_{clusters} = 5$) $N_{samples} = 5$ | 18 | 0 | 0.94 1.00 | 0.89 |

Table 5 shows that in terms of precision and recall performance, the three optimal performing configurations provide two extreme cases and a compromise case therebetween.

One extreme case here is agglomerative clustering (hereinafter, a first configuration) in which the $\chi^2$ kernel providing a 100% recall (but precision of 75%) is used, and the other extreme case is DBSCAN (hereinafter, a second configuration) in which the intersection kernel providing 100% precision (recall of 89%) is used, and the trade-off case between them is spectral clustering that uses the $\chi^2$ kernel, which provides 82% precision and 95% of recall (hereinafter referred to as a third configuration).

In the first configuration, the optimal number of superclusters is two, which allows use of the first configuration for zero-shot label inference operations.

In the second and third configurations, the number of output superclusters is ten (spectral clustering) and five (DBSCAN), respectively, and use of zero-shot label inference operation mode is not allowed in classification.

Here, the critical concern may be dependence on characteristics of a particular data set of the parameters given in Table 5 above.

An optimal setting for the first configuration is to set the number of clusters to be found to two and use a complete linkage connection method.

The disclosed classification method aims to separate two distinct clusters, wherein one of them is a highly dominant cluster, and thus, choosing the complete linkage connection method that facilitates the "rich get richer" behavior is a natural choice, and the above setting may be typically used to achieve the objective of the disclosure.

According to the second configuration, an optimal setting includes setting a radius of a sample neighbor (determined by a Docstrum descriptor, a kernel used for the Docstrum descriptor, and attributes of classes to be separated, rather than by attributes of a data set) and the number of sample neighbors needed for a point to be regarded as a core point.

A percentile value of the first and third configurations, which are common parameters for all configurations, is 0, and this indicates that a single supercluster with minimum text contamination is labeled as a figure supercluster.

In order to ascertain the theoretical considerations summarized above, the method according to the disclosure is applied to a random subset of reasonably sized data sets by using the optimal parameters of Table 5, particularly the first and third configurations, and outputs according to the method are examined with the naked eyes.

This experiment showed excellent text/figure separation capability with respect to different types of figure regions and text regions related to patents, supporting the usefulness of the optimal settings given in Table 5 for typical cases.

However, in the third configuration, the optimal parameter values (Nclusters=10 and a percentile of 12.5%) do not exhibit the same stability for different subsets of a data set, nor do they have strong rationale.

This is because two or more Nclusters may actually represent the number of sub-classes of a main class in a data set (for example, different kinds of text or numerical regions of interest).

Thus, such a configuration is to be used with caution in a data set that is significantly different from the data set of the patent-related region of interest used in the disclosure as an example of a data set.

To obtain insight into the geometry of the text or figure cluster, nonlinear dimensional reduction was performed on the Docstrum feature vector transformed by the mapping approximating kernel by using a t-SNE method, and a 2D embedded space was used to list point clouds corresponding to feature vectors classified as "text" or "figure" by using the third configuration of Table 5 (the best in terms of the $F_1$ score).

Figure 16:
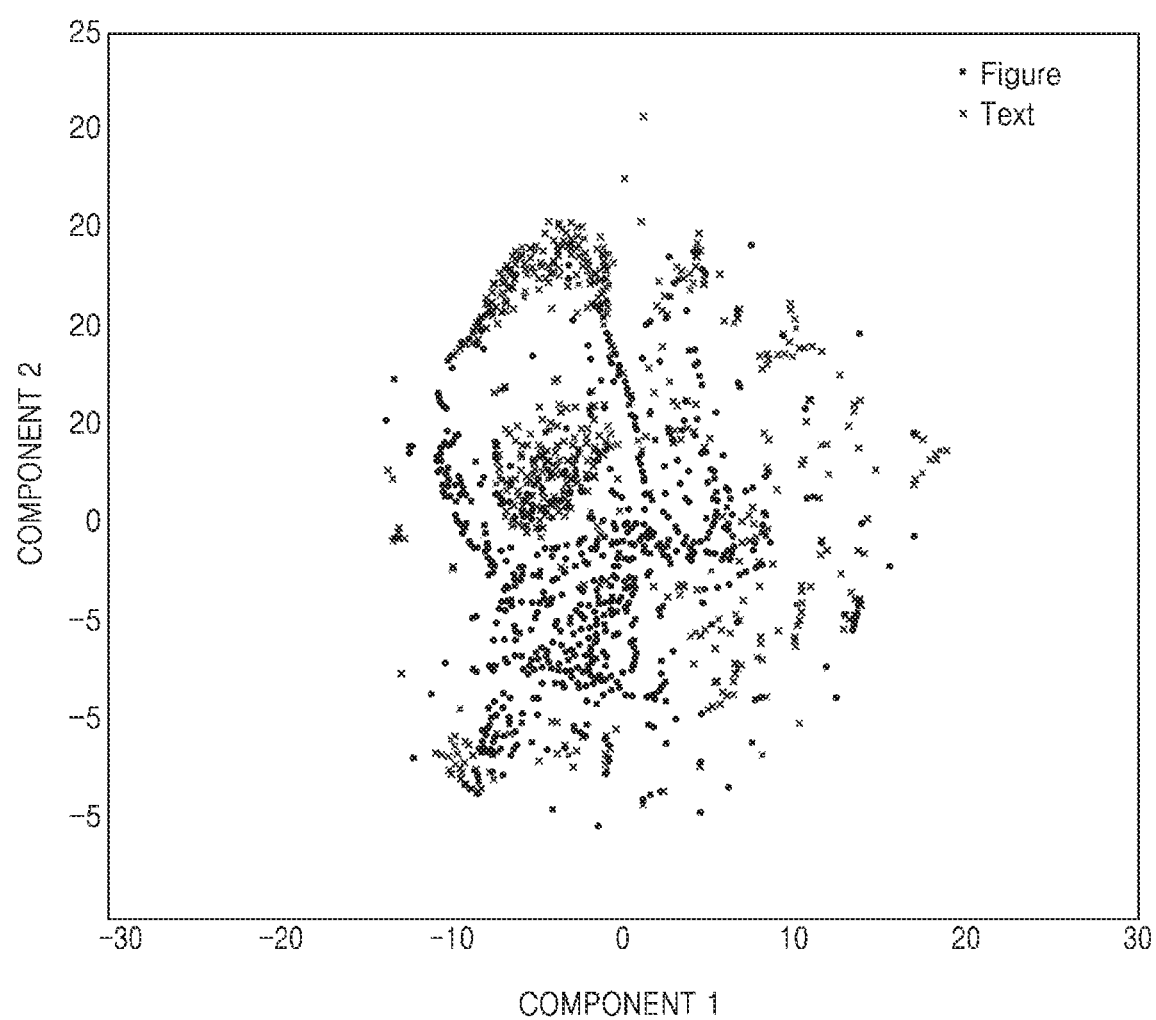
FIG. 16 is a graph showing a scatter plot of point clouds corresponding to a feature vector in a two-dimensional (2D) embedded space according to an embodiment of the disclosure.

FIG. 16 is a graph showing a scatter plot of point clouds corresponding to feature vectors in a 2D embedded space according to an embodiment of the disclosure.

Referring to FIG. 16, "text" points form a plurality of clusters, some of which have an elaborate non-convex geometry and are distant from one another, whereas most "figure" points form a high-density and localized cluster surrounded by text clusters.

The geometry of such text clusters and figure clusters may degrade classification performance in a configuration that uses a single class SVM.

A single class SVM which is a new detection method is a natural choice to achieve the objective of the disclosure. In an embodiment of the disclosure, a learning subset for a text class is used, and the purpose (of using the learning subset is to identify a figure class as an outlier with respect to a text class.

However, even when using a generalized radial basis function (RBF) and sigmoid kernels (in combination with a histogram-based kernel in kernel approximation, similar to RBF or sigmoid kernel in the SVM itself), a single class SVM does not exhibit classification performance of an efficient algorithm in processing complicated cluster shapes (e.g., DBSCAN or agglomerative clustering).

In conclusion, the disclosure is directed to a novel method of separating text and figures of a monochrome document image that includes a wide variety of figure classes, and allows for separation of many figure classes that are misclassified as text, by using a simple method. In addition, the method according to the disclosure is suitable for processing large data sets, and also, classification may be performed in the zero-shot inference mode (using only general line-of-sight information on text/figure distribution of the data set) or in the semi-supervised label propagation mode (using a small subset of data indicated as text) according to the disclosure.

These advantages are provided based on the use of Docstrum descriptors, kernel-approximating feature mapping for various histogram-based kernels (such as the $\chi^2$ kernel, the intersection kernel, and the Jaccard kernel), and efficient two-level clustering (mini-batch k-mean, agglomerative clustering, DBSCAN or the like).

The method of separating text and figures according to the disclosure has been proved in image data sets of large-amount and diverse patent-related documents, and an $F_1$ score of 0.86 for the zero-shot inference mode and an $F_1$ score of 0.94 for the semi-supervised label propagation mode were achieved.

The optimal parameters with respect to various operations of the disclosure may be obtained using a wide range of parameter optimization performed in the data sets, and experimental results of this method were analyzed, and optimal configurations were motivated based on theoretical considerations and experimental evidence.

Methods of separating text and figures according to the disclosure may be used as preprocessing operations of various document image processing operations such as document indexing and retrieval, document object detection and recognition, OCR, and document compression, and will be obvious to those of skill in the art through the description of the disclosure.

It should be understood that embodiments described herein should be considered in a descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of separating text and a figure of a document image, the method comprising:
    acquiring the document image;
    dividing the document image into a plurality of regions of interest;
    acquiring a feature vector by using a two-dimensional (2D) histogram, the 2D histogram being obtained by resizing one of the regions of interest among the plurality of the regions of interest, and performing connection component extraction on the resized region of interest;
    acquiring a transformation vector of the feature vector by using a kernel;
    acquiring a cluster center of the transformation vector;
    acquiring a supercluster by performing clustering on the cluster center; and
    classifying the supercluster into one of a text class and a figure class, based on the number of superclusters.

2. The method of claim 1, wherein the dividing of the document image into the plurality of regions of interest comprises:
    filling horizontal background pixels having a length equal to or less than a preset first threshold value, with a foreground color; filling vertical background pixels having a length equal to or less than a preset second threshold value, with the foreground color; performing a logical OR operation on a plurality of images including the horizontal background pixels filled with the foreground color and the vertical background pixels filled with the foreground color;
    acquiring a first connection component from an image resulting from the logical OR operation by performing the connection component extraction; and selecting a boundary box including the first connection component as the regions of interest.

3. The method of claim 1, wherein the acquiring of the feature vector by using the 2D histogram obtained by resizing one of the regions of interest among the plurality of the regions of interest, and performing the connection component extraction on the resized region of interest comprises:
resizing the regions of interest to a preset size while maintaining an aspect ratio of the regions of interest;
acquiring a second connection component by performing the connection component extraction on the resized regions of interest and acquiring a center point of the second connection component;
determining a nearest neighbor of the center point of the second connection component;
generating a 2D histogram with respect to a pair including the center point and the nearest neighbor;
performing normalization on the 2D histogram; and
reconstructing the 2D histogram on which the normalization is performed, as the feature vector.

4. The method of claim 3, wherein the resizing of the regions of interest to the preset size while maintaining the aspect ratio of the regions of interest comprises:
while maintaining the aspect ratio of the regions of interest, adjusting at least one of a height and a width of the regions of interest that is longer than the other to have a length corresponding to 300 pixels or 500 pixels; and
performing padding such that at least one of the height and the width of the regions of interest that is shorter than the other, has a length corresponding to 300 pixels or 500 pixels.

5. The method of claim 3, wherein the acquiring of the second connection component by performing the connection component extraction on the resized regions of interest and the acquiring of the center point of the second connection component comprise filtering the connection component having a boundary box whose width or height is less than a preset threshold value.

6. The method of claim 3, wherein the performing of the normalization on the 2D histogram further comprises dividing each of distances between the center point and the nearest neighbor by an average distance between the center point and the nearest neighbor.

7. The method of claim 3, wherein the reconstructing of the 2D histogram on which the normalization is performed, as the feature vector, comprises performing normalization such that the 2D histogram has a unified L1-norm.

8. The method of claim 1, wherein the acquiring of the supercluster comprises:
transforming a feature mapping into a first transformation vector by using kernel-approximating feature mapping;
acquiring the cluster center by performing first level clustering on the first transformation vector; and
acquiring the supercluster by performing second level clustering on the cluster center.

9. The method of claim 8, wherein the transforming of the feature vector into the first transformation vector by using the kernel-approximating feature mapping comprises performing kernel-approximating feature mapping based on at least one of a Hellinger's kernel, an $\chi^2$ kernel, an intersection kernel, a Jensen-Shannon kernel, or a Jaccard kernel.

10. The method of claim 8, wherein the acquiring of the supercluster by performing second level clustering on the cluster center comprises performing second level clustering based on at least one clustering algorithm from among an affinity propagation clustering algorithm, an agglomerative clustering algorithm, a mean shift clustering algorithm, a balanced iteration reduction and hierarchical clustering (BIRCH) algorithm, a density based space clustering of noisy applications (DBSCAN) algorithm, a hierarchical DBSCAN (HDBSCAN) algorithm, a single-class support vector machine (SVM) algorithm, and a spectral clustering algorithm.

11. The method of claim 8, wherein the classifying of the supercluster into one of classes of the text and the figure, based on the number of superclusters, comprises:
when the number of acquired superclusters is two, using a zero-shot label inference operation to classify each supercluster into one of a text class and a figure class; and
when the number of acquired superclusters is more than two, using a semi-supervised label propagation operation to classify each supercluster into one of classes, a text class and a figure class.

12. The method of claim 11, wherein the using of the zero-shot label inference operation to classify each supercluster into one of the text class and the figure class comprises labeling each of the superclusters into one of a text class and a figure class based on a ratio between a text region of interest and a figure region of interest.

13. The method of claim 11, wherein the using of the semi-supervised label propagation operation to classify each supercluster into one of classes, a text class and a figure class comprises:
calculating a degree of text contamination which is a ratio of a region of interest belonging to a subset assigned with a text label with respect to each of the superclusters; and
labeling a supercluster with respect to which a degree of the text contamination exceeds a preset threshold, as a text class, and labeling other superclusters with respect to which a degree of the text contamination does not exceed the preset threshold as a figure class.

14. The method of claim 13, wherein the subset assigned with the text label is obtained, after determining that none of texts of the document image contains a particular word, by labeling the entire regions of interest as a text region of interest.

15. An apparatus for separating a text and a figure of a document, the apparatus comprising:
at least one processor configured to:
acquire a document image,
divide the document image into a plurality of regions of interest,
acquire a feature vector by using a two-dimensional (2D) histogram, the 2D histogram being obtained by resizing one of the regions of interest among the plurality of the regions of interest and by performing connection component extraction on the resized region of interest,
acquire a transformation vector of the feature vector by using a kernel,
acquire a cluster center of the transformation vector,
perform clustering on the cluster center to acquire a supercluster, and
classify the supercluster into one of a text class and a figure class based on the number of superclusters; and
a memory for storing the document image and the supercluster classified into one of the text class and the figure class by the at least one processor.

* * * * *